(12) United States Patent
Tsuboi et al.

(10) Patent No.: US 10,858,977 B2
(45) Date of Patent: *Dec. 8, 2020

(54) EXHAUST GAS PURIFICATION CONTROLLER FOR ENGINE

(71) Applicant: MAZDA MOTOR CORPORATION, Hiroshima (JP)

(72) Inventors: Goro Tsuboi, Hiroshima (JP); Takayuki Yamaguchi, Hatsukaichi (JP); Daishi Ikeda, Hatsukaichi (JP); Yoshiaki Tomita, Hiroshima (JP); Chikara Ishihara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/343,000

(22) PCT Filed: Oct. 13, 2017

(86) PCT No.: PCT/JP2017/037230
§ 371 (c)(1),
(2) Date: Apr. 18, 2019

(87) PCT Pub. No.: WO2018/074367
PCT Pub. Date: Apr. 26, 2018

(65) Prior Publication Data
US 2020/0056526 A1  Feb. 20, 2020

(30) Foreign Application Priority Data
Oct. 19, 2016  (JP) ................................ 2016-205444

(51) Int. Cl.
*F01N 3/20* (2006.01)
*F01N 3/08* (2006.01)
(Continued)

(52) U.S. Cl.
CPC ......... *F01N 3/208* (2013.01); *B01D 53/9418* (2013.01); *B01D 53/9422* (2013.01);
(Continued)

(58) Field of Classification Search
CPC ............ B01D 53/9418; B01D 53/9422; B01D 53/9495; F01N 3/0814; F01N 3/0842;
(Continued)

(56) References Cited

U.S. PATENT DOCUMENTS

2005/0166579 A1  8/2005  Suzuki et al.
2006/0010857 A1  1/2006  Hu et al.
(Continued)

FOREIGN PATENT DOCUMENTS

DE  10 2008 043 706 A1  5/2010
DE  10 2015 224 267 A1  10/2016
(Continued)

OTHER PUBLICATIONS

International Search Report issued in PCT/JP2017/037230; dated Nov. 21, 2017.
(Continued)

*Primary Examiner* — Audrey K Bradley
*Assistant Examiner* — Dapinder Singh
(74) *Attorney, Agent, or Firm* — Studebaker & Brackett PC

(57) ABSTRACT

An $NH_3$ supply amount controller reduces and adjusts a supply amount of $NH_3$ to an SCR catalyst by an $NH_3$ supplier, when an exhaust gas flowing into an $NO_X$ catalyst has a rich air-fuel ratio and $NO_X$ occluded by the $NO_X$ catalyst is reduced to $N_2$. A reduction amount of the supply amount of the $NH_3$ controlled by the $NH_3$ supply amount controller is set smaller when a temperature of the $NO_X$ catalyst detected or estimated by an $NO_X$ catalyst temperature detector is higher.

7 Claims, 11 Drawing Sheets

(51) Int. Cl.
  *B01D 53/94* (2006.01)
  *F02D 41/02* (2006.01)
(52) U.S. Cl.
  CPC ....... *B01D 53/9495* (2013.01); *F01N 3/0814* (2013.01); *F01N 3/0842* (2013.01); *F01N 3/2073* (2013.01); *F02D 41/0275* (2013.01); *F01N 2610/02* (2013.01); *F01N 2900/0601* (2013.01); *F01N 2900/1602* (2013.01); *F01N 2900/1812* (2013.01)
(58) Field of Classification Search
  CPC ...... F01N 3/2066; F01N 3/2073; F01N 3/208; F01N 9/00; F01N 2610/02; F01N 2900/0601; F01N 2900/1411; F01N 2900/1602; F01N 2900/1812; F02D 41/02; F02D 41/0275; Y02T 10/24; Y02T 10/47
  USPC .................. 60/274, 277, 286, 295, 299–301
  See application file for complete search history.

(56) References Cited

U.S. PATENT DOCUMENTS

2014/0356237 A1* 12/2014 Sakurai ................ F01N 3/2073
  422/111
2015/0322839 A1* 11/2015 Oda ........................ F01N 3/208
  422/111
2016/0256823 A1* 9/2016 Devarakonda ......... B01D 53/90
2016/0290197 A1 10/2016 Lee et al.

FOREIGN PATENT DOCUMENTS

| | | |
|---|---|---|
| EP | 2 949 894 A1 | 12/2015 |
| JP | 3518398 B2 | 4/2004 |
| JP | 4347076 B2 | 10/2009 |
| JP | 2010112345 A | 5/2010 |
| JP | 2012172545 A | 9/2012 |
| WO | 2014115303 A1 | 7/2014 |

OTHER PUBLICATIONS

An Office Action issued by the Japanese Patent Office dated Sep. 25, 2017, which corresponds to Japanese Patent Application No. 2016-205444.

The extended European search report issued by the European Patent Office dated Jun. 24, 2019, which corresponds to EP17861707.2-1004 and is related to U.S. Appl. No. 16/343,000.

International Preliminary Report on Patentability and Written Opinion issued in PCT/JP2017/037230; dated Apr. 23, 2019.

* cited by examiner

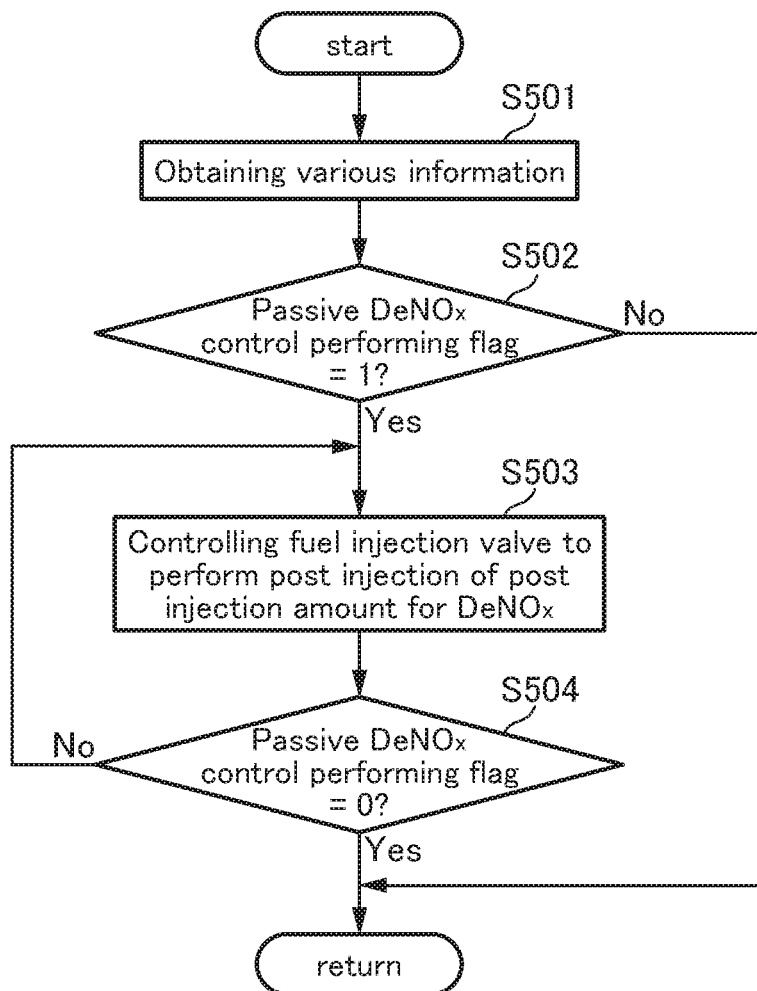

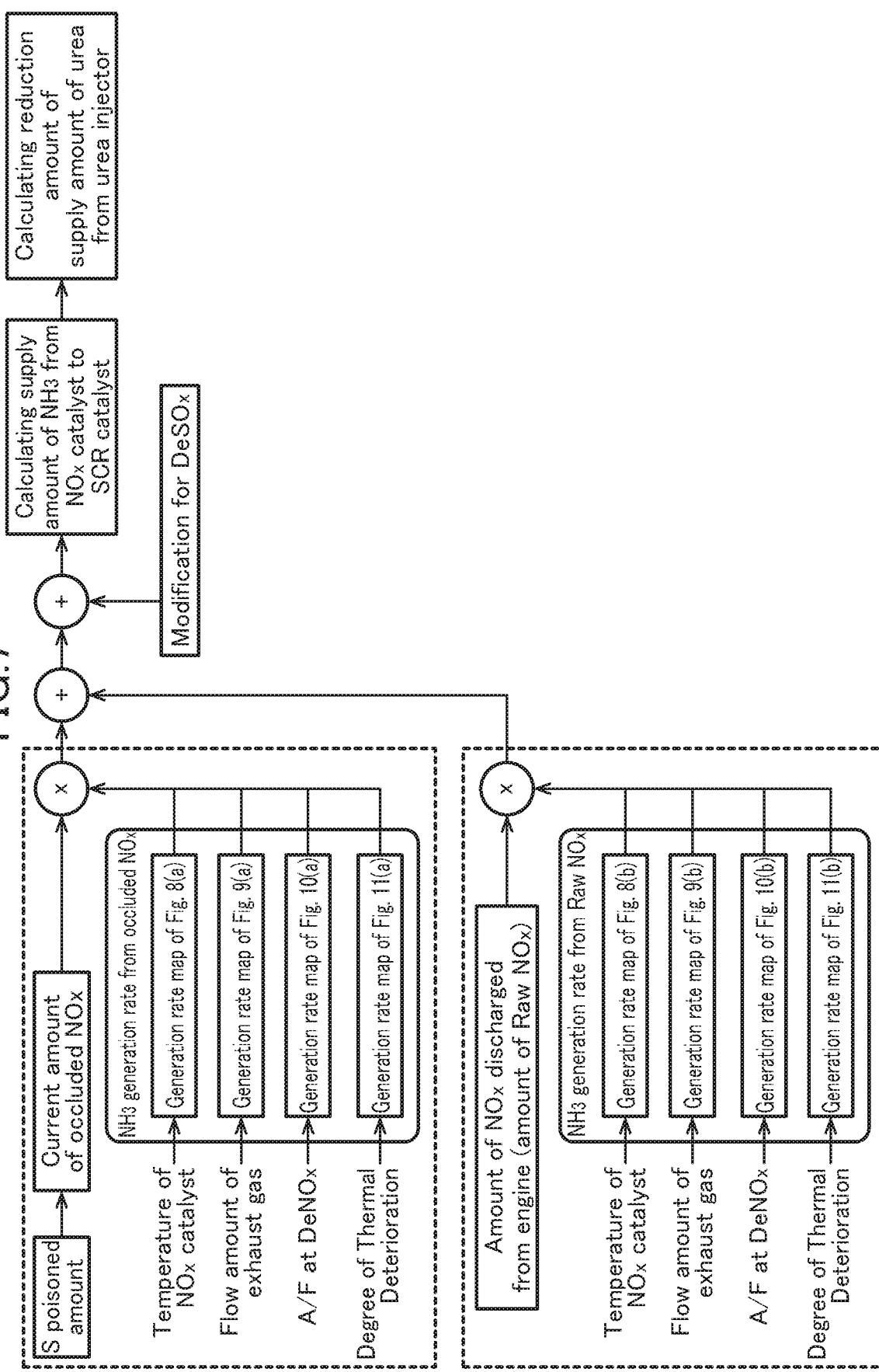

Occluded NOx_NH3 generation characteristics

Raw NOx_NH3 generation characteristics

Occluded NOx_NH3 generation characteristics

Raw NOx_NH3 generation characteristics

EXHAUST GAS PURIFICATION CONTROLLER FOR ENGINE

TECHNICAL FIELD

The present invention relates to an exhaust gas purification controller for an engine, in particular to an exhaust gas purification controller for an engine having an $NO_x$ catalyst for purifying $NO_x$ in an exhaust gas on an exhaust gas passage.

BACKGROUND ART

Conventionally, as shown in JP-B-3518398, there is known an exhaust gas purifier for an engine which includes: an SCR catalyst provided on an exhaust gas passage of the engine and configured to purify $NO_x$ in an exhaust gas by a reaction with $NH_3$; and an $NO_x$ catalyst of an $NO_x$ storage (occlusion) reduction type configured to occlude $NO_x$ in the exhaust gas in a lean state wherein an air-fuel ratio of the exhaust gas is larger than a stoichiometric air-fuel ratio ($\lambda$>1) and to reduce the occluded $NO_x$ in another state wherein the air-fuel ratio of the exhaust gas is in a vicinity of the stoichiometric air-fuel ratio ($\lambda \approx 1$) or in a rich state wherein the air-fuel ratio of the exhaust gas is smaller than the stoichiometric air-fuel ratio ($\lambda$<1). In this exhaust gas purifier for an engine, when the engine is in a state of a high rotation-speed and a high load, that is, when the engine is in a driving range wherein a temperature of the SCR catalyst is high, purification of $NO_x$ by the SCR catalyst is performed, and when the engine is in other states, purification of $NO_x$ by the $NO_x$ catalyst is performed.

In addition, as shown in JP-A-2010-112345, there is known another exhaust gas purifier in which purification of $NO_x$ by an SCR catalyst is performed by causing the SCR catalyst to absorb $NH_3$ generated in an $NO_x$ reduction control at an $NO_x$ catalyst, instead of providing a urea injection valve for injecting urea to the SCR catalyst. That is, it is known that such an $NO_x$ reduction control generates $NH_3$. In addition, as shown in JP-B-4347076, it is known that a conversion rate, at which $NO_x$ is converted into $NH_3$ in an $NO_x$ catalyst, can be calculated by detecting a temperature of the $NO_x$ catalyst. Furthermore, it is known that the amount of $NH_3$ generated in an $NO_x$ reduction control varies dependently on a temperature of an $NO_x$ catalyst. In detail, it is disclosed that, when the temperature of the $NO_x$ catalyst is higher, the generated amount of $NH_3$ is higher.

SUMMARY OF INVENTION

As shown in JP-B-3518398, when an $NO_x$ reduction control is performed by an $NO_x$ catalyst while $NH_3$ is supplied to an SCR catalyst by a urea injection valve, $NH_3$ may be supplied to the SCR catalyst too much because of $NH_3$ generated by the $NO_x$ reduction control. As a result, $NH_3$ may be supplied to the SCR catalyst in an amount exceeding an absorption capacity of the SCR catalyst, and thus $NH_3$ may be discharged to an exhaust gas passage downstream the SCR catalyst.

Under the circumstance, it is conceivable to inhibit such an excessive ammonia supply to the SCR catalyst by taking into consideration the amount of $NH_3$ generated at the $NO_x$ catalyst reduction control, and thereby inhibit the ammonia from being discharged to the exhaust gas passage downstream the SCR catalyst.

However, the amount of $NH_3$ generated at the $NO_x$ reduction control varies dependently on the temperature of the $NO_x$ catalyst. Thus, unless this condition is taken into consideration, it is impossible to sufficiently inhibit the ammonia from being discharged to the exhaust gas passage downstream the SCR catalyst. Alternatively, the ammonia supply to the SCR catalyst may be inhibited too much, which may result in shortage of $NH_3$ absorbed by the SCR catalyst so that performance of purification of $NO_x$ by the SCR catalyst may be deteriorated.

In JP-B-4347076, it is disclosed that, when the temperature of the $NO_x$ catalyst is higher, $NH_3$ generation rate is higher. Thus, it is conceivable that JP-B-4347076 takes into consideration such a condition that a reaction generating $NH_3$ occurs more likely when the temperature of the $NO_x$ catalyst is higher.

However, when the temperature of the $NO_x$ catalyst is higher, not only the reaction generating $NH_3$ occurs more likely, but also another reaction decomposing the generated $NH_3$ occurs more likely. JP-B-4347076 does not take into consideration this decomposing reaction, so that $NH_3$ generated at the $NO_x$ catalyst reduction control cannot be known correctly.

The present invention was made based on the above background. An object of the present invention is to provide an exhaust gas purification controller for an engine which can achieve efficient purification of $NO_x$ while inhibiting ammonia from being discharged to an exhaust gas passage downstream an SCR catalyst, by correctly grasp (know) $NH_3$ generated at an $NO_x$ catalyst reduction control and making it possible to suitably inhibiting an excessive ammonia supply to the SCR catalyst.

The present invention is an exhaust gas purification controller for an engine, including: an $NO_x$ catalyst provided on an exhaust gas passage of the engine, and configured to occlude $NO_x$ in an flowing-in exhaust gas in a state wherein an air-fuel ratio of the flowing-in exhaust gas is leaner than a stoichiometric air-fuel ratio and to reduce the occluded $NO_x$ to $N_2$ in a state wherein the air-fuel ratio of the flowing-in exhaust gas is richer than the stoichiometric air-fuel ratio; an $NO_x$ catalyst regenerator configured to control a fuel injection valve in the engine in order to make the air-fuel ratio of the flowing-in exhaust gas to the $NO_x$ catalyst richer; an SCR catalyst provided on the exhaust gas passage downstream the $NO_x$ catalyst, and configured to purify $NO_x$ by a reaction with $NH_3$; an $NH_3$ supplier configured to supply $NH_3$ or a raw material for $NH_3$ to the SCR catalyst and cause the SCR catalyst to absorb the $NH_3$ or the raw material for $NH_3$; an $NH_3$ supply amount controller configured to control a supply amount of the $NH_3$ or the raw material for $NH_3$ to the SCR catalyst by the $NH_3$ supplier; and an $NO_x$ catalyst temperature detector configured to detect or estimate a temperature of the $NO_x$ catalyst; wherein the $NH_3$ supply amount controller is configured to reduce the supply amount of the $NH_3$ or the raw material for $NH_3$ to the SCR catalyst by the $NH_3$ supplier when the $NO_x$ catalyst regenerator has performed an $NO_x$ catalyst regeneration, compared with when the $NO_x$ catalyst regenerator has not performed the $NO_x$ catalyst regeneration; and the supply amount of the $NH_3$ or the raw material for $NH_3$ controlled by the $NH_3$ supply amount controller when the $NO_x$ catalyst regenerator has performs the $NO_x$ catalyst regeneration is set larger when the temperature of the $NO_x$ catalyst detected or estimated by the $NO_x$ catalyst temperature detector is higher.

According to the present invention, since the supply amount of the $NH_3$ or the raw material for $NH_3$ controlled by the $NH_3$ supply amount controller when the $NO_x$ catalyst regenerator has performs the $NO_x$ catalyst regeneration is set larger when the temperature of the $NO_x$ catalyst is higher, a generated amount of $NH_3$ in the $NO_x$ catalyst can be taken into consideration and efficient purification of $NO_x$ can be achieved.

More specifically, for example, it is preferable that the $NH_3$ supply amount controller is configured to reduce and adjust the supply amount of the $NH_3$ or the raw material for $NH_3$ to the SCR catalyst by the $NH_3$ supplier when the $NO_x$ catalyst regenerator has performed an $NO_x$ catalyst regeneration, and that a reduction amount of the supply amount of the $NH_3$ or the raw material for $NH_3$ controlled by the $NH_3$ supply amount controller is set smaller when the temperature of the $NO_x$ catalyst detected or estimated by the $NO_x$ catalyst temperature detector is higher.

In the case, since the reduction amount of the supply amount of the $NH_3$ or the raw material for $NH_3$ controlled by the $NH_3$ supply amount controller is set smaller when the temperature of the $NO_x$ catalyst is higher, the generated amount of $NH_3$ in the $NO_x$ catalyst can be taken into consideration and efficient purification of $NO_x$ can be achieved.

According to findings by inventors of the present invention, when the temperature of the $NO_x$ catalyst is higher, reaction promoting effects become greater in a reaction consuming $NH_3$ in the $NO_x$ catalyst (see paragraph 0142), which reduces the generated amount of $NH_3$ in the $NO_x$ catalyst. This phenomenon has been reflected to the present invention.

In addition, it is preferable that an exhaust-gas flow amount detector configured to detect or estimate a flow amount of the exhaust gas is further provided and that the reduction amount of the supply amount of the $NH_3$ or the raw material for $NH_3$ controlled by the $NH_3$ supply amount controller is set to vary less greatly as the temperature of the $NO_x$ catalyst detected or estimated by the $NO_x$ catalyst temperature detector varies, when the flow amount of the exhaust gas detected or estimated by the exhaust-gas flow amount detector is larger.

In this case, efficient purification of $NO_x$ can be achieved in which the generated amount of $NH_3$ in the $NO_x$ catalyst can be taken into consideration more precisely.

In addition, it is preferable that an SCR catalyst temperature detector configured to detect or estimate a temperature of the SCR catalyst is further provided and that when the flow amount of the exhaust gas detected or estimated by the exhaust-gas flow amount detector is smaller than a predetermined threshold and when the temperature of the SCR catalyst detected or estimated by the SCR catalyst temperature detector is smaller than a predetermined threshold, purification of $NO_x$ is performed mainly only by the $NO_x$ catalyst; when the flow amount of the exhaust gas detected or estimated by the exhaust-gas flow amount detector is smaller than a predetermined threshold and when the temperature of the SCR catalyst detected or estimated by the SCR catalyst temperature detector is equal to or larger than a predetermined threshold, purification of $NO_x$ is performed mainly only by the SCR catalyst; and when the flow amount of the exhaust gas detected or estimated by the exhaust-gas flow amount detector is equal to or larger than a predetermined threshold, both the purification of $NO_x$ by the $NO_x$ catalyst and the purification of $NO_x$ by the SCR catalyst are performed.

In this case, efficient purification of $NO_x$ can be achieved based on the flow amount of the exhaust gas and based on the temperature of the SCR catalyst.

In addition, in this case, it is preferable that, when the purification of $NO_x$ is performed mainly only by the $NO_x$ catalyst, the $NH_3$ supply amount controller is configured to limit the supply amount of the $NH_3$ or the raw material for $NH_3$ to the SCR catalyst by the $NH_3$ supplier, and that, when the purification of $NO_x$ is performed mainly only by the SCR catalyst, an operation of the $NO_x$ catalyst regenerator is limited.

In addition, it is preferable that the $NH_3$ supply amount controller has: a first reduction amount determiner configured to determine a reduction amount corresponding to a purification process of $NO_x$ that has been occluded in the $NO_x$ catalyst; and a second reduction amount determiner configured to determine a reduction amount corresponding to a purification process of Raw $NO_x$; and that the reduction amount of the supply amount of the $NH_3$ or the raw material for $NH_3$ determined by the first reduction amount determiner is set to vary more greatly, compared with the reduction amount of the supply amount of the $NH_3$ or the raw material for $NH_3$ determined by the second reduction amount determiner, as the temperature of the $NO_x$ catalyst detected or estimated by the $NO_x$ catalyst temperature detector varies.

In this case, a generated amount of $NH_3$ in the purification process of $NO_x$ that has been occluded in the $NO_x$ catalyst and a generated amount of $NH_3$ in the purification process of Raw $NO_x$ can be taken into consideration independently of each other. Thus, efficient purification of $NO_x$ can be achieved in which the generated amount of $NH_3$ in the $NO_x$ catalyst can be taken into consideration more precisely.

In addition, in this case, it is preferable that an exhaust-gas flow amount detector configured to detect or estimate a flow amount of the exhaust gas is further provided, and that both the reduction amount of the supply amount of the $NH_3$ or the raw material for $NH_3$ determined by the first reduction amount determiner and the reduction amount of the supply amount of the $NH_3$ or the raw material for $NH_3$ determined by the second reduction amount determiner are set to vary less greatly as the temperature of the $NO_x$ catalyst detected or estimated by the $NO_x$ catalyst temperature detector varies, when the flow amount of the exhaust gas detected or estimated by the exhaust-gas flow amount detector is larger, and that the reduction amount of the supply amount of the $NH_3$ or the raw material for $NH_3$ determined by the first reduction amount determiner is set to vary more greatly, compared with the reduction amount of the supply amount of the $NH_3$ or the raw material for $NH_3$ determined by the second reduction amount determiner, as the flow amount of the exhaust gas detected or estimated by the exhaust-gas flow amount detector varies.

For example, in this case, the reduction amount of the supply amount of the $NH_3$ or the raw material for $NH_3$ determined by the second reduction amount determiner may be set substantially constant no matter how the temperature of the $NO_x$ catalyst detected or estimated by the $NO_x$ catalyst temperature detector varies.

In addition, it is preferable that the $NH_3$ supply amount controller is configured to reduce and adjust the supply amount of the $NH_3$ or the raw material for $NH_3$ to the SCR catalyst by the $NH_3$ supplier, based on the reduction amount of the supply amount of the $NH_3$ or the raw material for $NH_3$ determined by the first reduction amount determiner and the reduction amount of the supply amount of the $NH_3$ or the raw material for $NH_3$ determined by the second reduction amount determiner, for example based on the sum of the former reduction amount and the latter reduction amount.

EFFECTS OF INVENTION

According to an aspect of the present invention, since the reduction amount of the supply amount of the $NH_3$ or the raw material for $NH_3$ controlled by the $NH_3$ supply amount controller is set smaller when the temperature of the $NO_x$ catalyst is higher, the generated amount of $NH_3$ in the $NO_x$ catalyst can be taken into consideration and efficient purification of $NO_x$ can be achieved.

BRIEF DESCRIPTION OF DRAWINGS

FIG. 6B is a flowchart showing the active $DeNO_x$ control and the passive $DeNO_x$ control according to the embodiment of the present invention;

FIG. 7 is a schematic view of a calculation flow for a reduction amount of a supply amount of urea according to an embodiment of the present invention;

MODE FOR CARRYING OUT INVENTION

An exhaust gas purification controller for an engine according to an embodiment of the present invention will be described below with reference to the attached drawings.

<System Structure>

Figure 1:
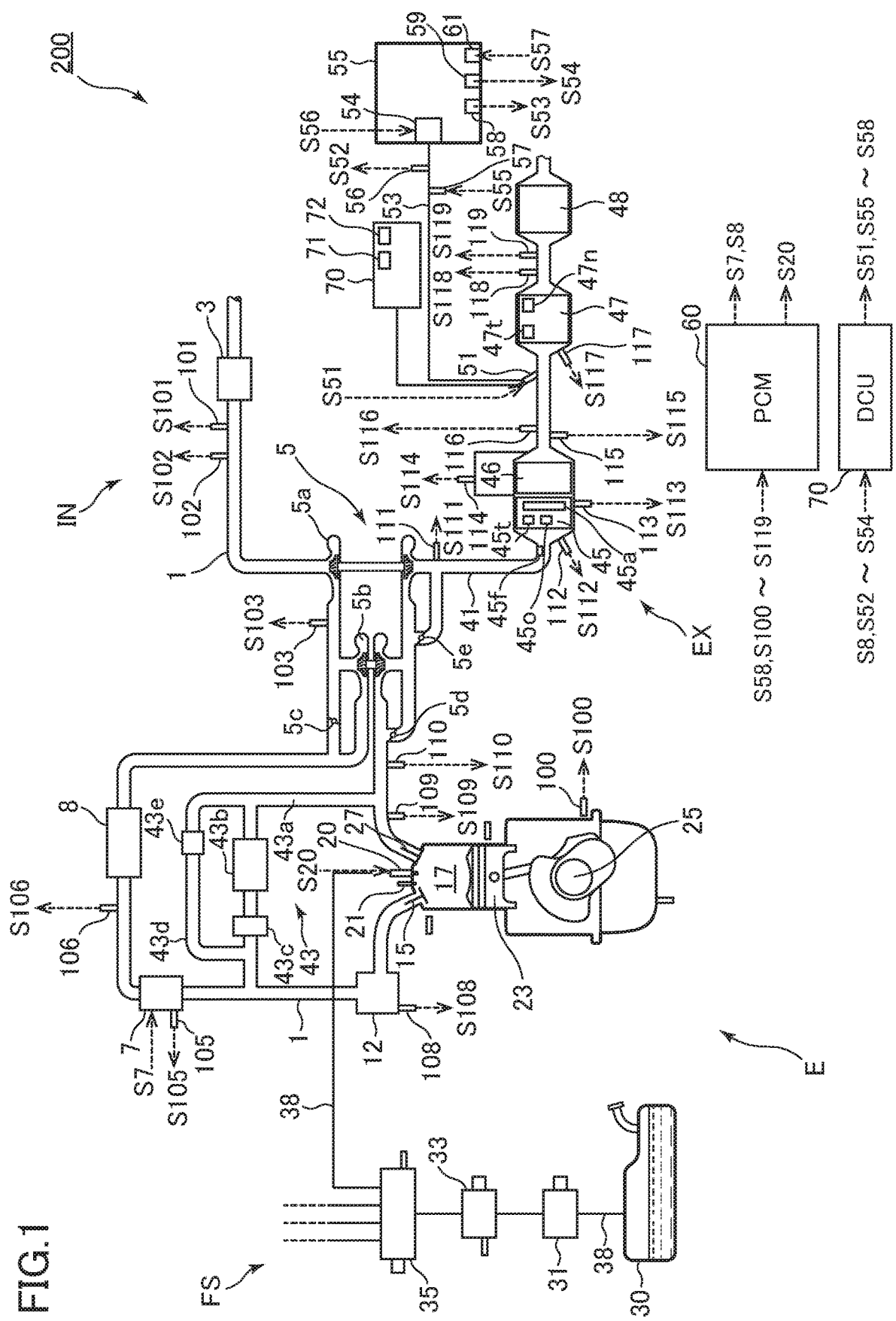
FIG. 1 is a schematic structural view of an engine system to which an exhaust gas purification controller for an engine according to an embodiment of the present invention is applied.

Initially, with reference to FIG. 1, explained is an engine system to which an exhaust gas purification controller for an engine according to an embodiment of the present invention is applied. FIG. 1 is a schematic structural view of such an engine system to which an exhaust gas purification controller for an engine according to an embodiment of the present invention has been applied.

As shown in FIG. 1, the engine system 200 mainly includes: an engine E as a diesel engine; an intake system IN configured to provide an intake to the engine E; a fuel supply system FS configured to supply fuel to the engine E; an exhaust gas system EX configured to discharge an exhaust gas of the engine E, sensors 100 to 119 configured to detect various conditions relating to the engine system 200; a PCM (Power-train control Module) 60 configured to control the engine system 200; and a DCU (Dosing control Unit) 70 configured to perform a control relating to an SCR catalyst.

First, the intake system IN has an intake passage 1, through which an intake air passes. On the intake passage 1, in the following order from its upstream side, there are provided with: an air cleaner 3 configured to purify the air introduced from the outside; a compressor of a turbocharger 5 configured to compress the intake air passing therethrough to raise an intake air pressure; an intercooler 8 configured to cool the intake air by an outside air or a cooling water; an intake shutter valve 7 (which corresponds to a throttle valve) configured to adjust a flow amount of the intake air passing therethrough; and a surge tank 12 configured to temporarily store the intake air to be supplied to the engine E.

On the intake passage 1 on a side just downstream the air cleaner 3, an air flow sensor 101 configured to detect an amount of intake air and a temperature sensor 102 configured to detect an intake air temperature. A pressure sensor 103 configured to detect the intake air pressure is provided on the turbocharger 5. Another temperature sensor 106 configured to detect the intake air temperature is provided on the intake passage 1 just downstream the intercooler 8. A position sensor 105 configured to detect an open degree of the intake shutter valve 7 is provided on the intake shutter valve 7. A pressure sensor 108 configured to detect the intake air pressure at an intake manifold is provided on the surge tank 12. These sensors 101 to 108 are respectively configured to output detection signals S101 to S108 corresponding to their detected parameters to the PCM 60.

Next, the engine E includes: an intake valve 15 configured to introduce the intake air supplied from the intake passage 1 (more specifically, the intake manifold) into a combustion chamber 17; a fuel injection valve 20 configured to inject fuel toward the combustion chamber 17; a glow plug 21 having a heat generating part located in the combustion chamber 17 and configured to generate heat by applying an electric current; a piston 23 configured to reciprocate by combustion of an air-fuel mixture in the combustion chamber 17; a crankshaft 25 configured to be rotated by a reciprocation of the piston 23; and an exhaust valve 27 configured to discharge an exhaust gas generated by the combustion of the air-fuel mixture in the combustion chamber 17 to an exhaust passage 41. In addition, the engine E is provided with a crank-angle sensor 100 configured to detect a crank angle as a rotational angle compared with a top dead point or the like of the crank shaft 25. The crank-angle sensor 100 is configured to output a detection signal S100 corresponding to the detected crank angle to the PCM 60. The PCM 60 is configured to obtain an engine rotation speed based on the detection signal S100.

The fuel supply system FS has: a fuel tank 30 configured to store the fuel; and a fuel supply passage 38 configured to supply the fuel from the fuel tank 30 to the fuel injection valve 20. The fuel supply passage 38 includes, in the following order from its upstream side, a low-pressure fuel pump 31, a high-pressure fuel pump 33, and a common rail 35.

Next, the exhaust gas system EX has the exhaust passage 41, through which the exhaust gas passes. On the exhaust passage 41, there is provided a turbine of the turbocharger 5 configured to be rotated by the exhaust gas and to drive the compressor by its rotation as described above. In addition, on the exhaust passage 41 downstream the turbine, in the following order from its upstream side, there are provided: an $NO_x$ catalyst 45 configured to purify $NO_x$ (Raw $NO_x$) in the exhaust gas; a diesel particulate filter (DPF: Diesel Particulate Filter) 46 configured to collect particulate matters (PM: Particulate Matter) in the exhaust gas; and an urea injector 51 configured to inject urea (typically, urea aqueous) toward an inside of the exhaust passage 41 on a side downstream of the DPF 46.

The $NO_x$ catalyst 45 tends to occlude $NO_x$ in the exhaust gas in a lean state wherein an air-fuel ratio of the flowing-in exhaust gas is larger than a stoichiometric air-fuel ratio ($\lambda > 1$), and tends to reduce the occluded $NO_x$ in another state wherein the air-fuel ratio of the flowing-in exhaust gas is in a vicinity of the stoichiometric air-fuel ratio ($\lambda \approx 1$) or in a rich state wherein the air-fuel ratio of the exhaust gas is smaller than the stoichiometric air-fuel ratio ($\lambda < 1$), so that the $NO_x$ catalyst 45 is called an $NO_x$ storage (occlusion) reduction type of catalyst (NSC: $NO_x$ Storage Catalyst). The $NO_x$ catalyst 45 generates and releases $NH_3$ (ammonia) when the $NO_x$ catalyst 45 reduces $NO_x$ that has been occluded therein. Specifically, when the $NO_x$ is reduced, "N" in the $NO_x$ that has been occluded in the $NO_x$ catalyst 45 and "H" in "HC" such as unburned fuel supplied toward the $NO_x$ catalyst 45 as a reducing agent, or "H" in "$H_2O$" generated by in-cylinder combustion, are united to generate $NH_3$ (ammonia). Further details of these reactions are explained in paragraph 0142.

Herein, although the details are explained later, the occluded $NO_x$ is reduced and purified (by an $NO_x$ catalyst regenerator) by controlling the fuel injection valve 20 in the engine E to bring the air-fuel ratio of the flowing-in exhaust gas into a rich state when an amount of the $NO_x$ occluded in the $NO_x$ catalyst 45 (hereinafter, referred as an $NO_x$ occlusion amount) becomes equal to or larger than a predetermined threshold. In the present embodiment, the PCM 60 serves as the $NO_x$ catalyst regenerator (has a function as the $NO_x$ catalyst regenerator).

An amount of $NO_x$ in the exhaust gas may be estimated based on a driving state of the engine E, a flow amount (flow rate) of the exhaust gas, a temperature of the exhaust gas, and the like. The $NO_x$ occlusion amount in the $NO_x$ catalyst 45 may be estimated by adding up the amount of $NO_x$ in the exhaust gas. Alternatively, the $NO_x$ occlusion amount in the $NO_x$ catalyst 45 may be directly detected by an $NO_x$-occlusion-amount detecting sensor 45n.

The $NO_x$ catalyst 45 of the present embodiment has not only the function as the NSC, but also a function as a diesel oxidation catalyst (DOC: Diesel Oxidation Catalyst) 45a (oxidation catalyst) which uses oxygen in the exhaust gas to oxidize hydro carbon (HC), carbon mo$NO_x$ide (CO) or the like into water and carbon dioxide.

More specifically, the $NO_x$ catalyst 45 of the present embodiment is made of a surface of a catalyst material layer serving as the diesel oxidation catalyst 45a being coated by another catalyst material serving as the NSC. Thus, the $NO_x$ catalyst 45 forms a composite catalyst including the diesel oxidation catalyst 45a. That is, the $NO_x$ catalyst 45 is arranged (formed) by being combined with the diesel oxidation catalyst 45a. Thus, when a temperature of the diesel oxidation catalyst 45a is raised by reaction heat of a$NO_x$idizing reaction, the reaction heat is transferred to the $NO_x$ catalyst 45, so that a temperature of the $NO_x$ catalyst 45 is raised.

In the present embodiment, a temperature sensor 112 is provided on a side just upstream of the $NO_x$ catalyst 45. The temperature of the $NO_x$ catalyst 45 may be estimated based on a temperature detected by the temperature sensor 112. Alternatively, the temperature of the $NO_x$ catalyst 45 may be detected by another temperature sensor 113 located between the $NO_x$ catalyst 45 and the DPF 46. Alternatively, the $NO_x$ catalyst 45 may be provided directly with an $NO_x$-catalyst-temperature detecting sensor 45t configured to detect a temperature of the $NO_x$ catalyst 45.

In addition, in the present embodiment, the flow amount of the exhaust gas flowing into the $NO_x$ catalyst 45 is estimated based on the driving state of the engine, more specifically an engine rotation speed and an engine load. However, an exhaust-gas flow amount detecting sensor 45f configured to detect the flow amount of the exhaust gas flowing into the $NO_x$ catalyst 45 may be provided.

In addition, on a side further downstream of the urea injector 51, there is arranged an SCR (Selective Catalytic Reduction) catalyst 47 configured to react (reduce) the $NO_x$ in the exhaust gas with the $NH_3$ generated in the $NO_x$ catalyst 45 to purify the $NO_x$. The SCR catalyst 47 has also a function of hydrolyzing the urea injected from the urea injector 51 to generate $NH_3$ (ammonia) ($CO(N\ H_2)_2 + H_2O \rightarrow CO_2 + 2NH_3$), and to react (reduce) the $NO_x$ in the exhaust gas with the $NH_3$ to purify the $NO_x$. The urea injector 51 is configured to be controlled by a control signal S51 supplied from the DCU 70 to inject the urea toward the inside of the exhaust passage 41.

More specifically, the SCR catalyst 47 is configured to absorb the $NH_3$ (ammonia) generated by the purification (reduction) of $NO_x$ in the $NO_x$ catalyst 45 and/or the HN3 generated from the urea injected from the urea injector 51 (cause the $NH_3$ (ammonia) generated by the purification (reduction) of $NO_x$ in the $NO_x$ catalyst 45 and/or the HN3 generated from the urea injected from the urea injector 51 to stick to the SCR catalyst 47 itself), and to react the $NO_x$ in the exhaust gas with the absorbed (having-stuck) $NH_3$ to purify (reduce) the $NO_x$.

For example, the SCR catalyst 47 may be made of a catalyst metal having a function of reducing the $NO_x$ with the $NH_3$ (ammonia), which may be supported by zeolite having a function of trapping the $NH_3$ to be a catalyst component, which may be further supported by a cell wall as a honeycomb carrier. Fe, Ti, Ce, W or the like may be used as the catalyst metal for the $NO_x$ reduction.

Furthermore, on a side further downstream of the SCR catalyst 47, there is provided a slip catalyst 48 configured to oxidize and purify $NH_3$ (ammonia) ejected from the SCR catalyst 47. In addition, on the SCR catalyst 47, there is provided an SCR-catalyst-temperature detecting sensor 47t configured to detect a temperature of the SCR catalyst 47. The SCR-catalyst-temperature detecting sensor 47t is a sensor configured to directly detect a temperature of the SCR catalyst 47. However, instead of this, an indirect parameter related to a temperature of the SCR catalyst 47 may be measured and there may be provided an estimator configured to estimate the temperature of the SCR catalyst from the parameter. For example, a temperature of the SCR catalyst 47 may be estimated based on a temperature detected by a temperature sensor 117 on a side just upstream of the SCR catalyst 47.

In the present embodiment, the urea injector 51 serves as an $NH_3$ supplier configured to supply urea, which is a raw material for $NH_3$, to the SCR catalyst 47 and to cause the SCR catalyst 47 to absorb the urea (to cause the urea to stick to the SCT catalyst 47). As shown in FIG. 1, the urea injector 51 is connected to a urea supply passage 53, and the urea supply passage 53 is connected to a urea tank 55 through a urea delivery pump 54.

The urea supply passage 53 is formed by a pipe capable of delivering the urea (urea aqueous). On the urea supply passage 53, there is arranged a urea-supply-passage pressure sensor 56 configured to measure a change of a pressure thereon when the urea passes therethrough. In addition, on the urea supply passage 53, there is arranged a urea-passage heater 57 for preventing the urea from freezing thereon. The urea delivery pump 54 is configured to receive control commands from the DCU 70 and deliver the urea from the urea tank 55 toward the urea injector 51.

In the present embodiment, the DCU 70 serves as an $NH_3$ supply amount controller configured to control a supply amount of the urea (raw material for $NH_3$) to the SCR catalyst 47 by the urea injector 51 ($NH_3$ supplier).

The DCU 70 controls an amount of the urea injected from the urea injector 51 to cause the SCR catalyst 47 to absorb a suitable amount of $NH_3$, in order to achieve both secure $NO_x$ purification performance by the SCR catalyst 47 and inhibition of ejection (slip) of the $NH_3$ (ammonia) from the SCR catalyst 47.

Furthermore, the DCU 70 is electrically connected to the urea-supply-passage pressure sensor 56, a urea level sensor 58 and a urea temperature sensor 59. The urea-supply-passage pressure sensor 56, the urea level sensor 58 and the urea temperature sensor 59 are respectively configured to output detection signals S52 to S54 corresponding to their detected parameters to the DCU 70. In addition, the DCU 70 is electrically connected to the urea-passage heater 57, the urea delivery pump 54 and a urea-tank heater 61. Operational states of the urea-passage heater 57, the urea delivery pump 54 and the urea-tank heater 61 can be respectively controlled by control signals S55 to S57 supplied from the DCU 70.

The DCU 70 consists of a computer including: a CPU, various types of programs configured to be interpreted and executed by the CPU (including a basic control program such as an OS, and an application program to be executed on such an OS for achieving a specific function), and an inside memory such as ROM and/or RAM for storing such programs and/or various data. The DCU 70 is two-way communicably connected to the PCM 60, and is configured to receive control commands of the PCM 60 and be controlled thereby. For example, a control signal for supplying various information obtained by the DCU 70 to the PCM 60 is depicted as a control signal S58.

In addition, as shown in FIG. 1, on the exhaust passage 41 upstream the turbine of the turbocharger 5, there may be provided a pressure sensor 109 configured to detect a pressure of the exhaust gas and a temperature sensor 110 configured to detect a temperature of the exhaust gas. In addition, on the exhaust passage 41 just downstream the turbine of the turbocharger 5, there may be provided an O2 sensor 111 configured to detect oxygen density.

Furthermore, in the exhaust gas system EX, there are provided with: a temperature sensor 112 configured to detect a temperature of the exhaust gas just upstream the $NO_x$ catalyst 45; a temperature sensor 113 configured to detect a temperature of the exhaust gas between the $NO_x$ catalyst 45 and the DPF 46; a differential-pressure sensor 114 configured to detect a differential pressure of the exhaust gas between on a side just upstream of the DPF 46 and on an side just downstream of the DPF 46; a temperature sensor 115 configured to detect a temperature of the exhaust gas just downstream the DPF 46; an $NO_x$ sensor 116 configured to detect $NO_x$ density in the exhaust gas just downstream the DPF 46; a temperature sensor 117 configured to detect a temperature of the exhaust gas just upstream the SCR catalyst 47; an $NO_x$ sensor 118 configured to detect $NO_x$ density in the exhaust gas just downstream the SCR catalyst 47; and a PM sensor 119 configured to detect PM in the exhaust gas just upstream the slip catalyst 48. These sensors 109 to 119 are respectively configured to output detection signals S109 to S119 corresponding to their detected parameters to the PCM 60.

In addition, in the present embodiment, the turbocharger 5 serves as two-stage supercharging system capable of achieving efficiently high supercharging in the whole range from a low rotation speed range (in which exhaust energy is low) to a high rotation speed range. That is, the turbocharger 5 has: a large-sized turbocharger 5a configured to supercharge a large amount of air in a high rotation speed range; a small-sized turbocharger 5b capable of efficiently supercharging even with low exhaust energy; a compressor bypass valve 5c configured to control a flow of the intake air to a compressor of the small-sized turbocharger 5b; a regulator valve 5d configured to control a flow of the exhaust gas to a turbine of the small-sized turbocharger 5b; and a waste gate valve 5e configured to control a flow of the exhaust gas to a turbine of the large-sized turbocharger 5a. These valves are respectively driven based on the running state of the engine E (the engine rotation speed and the engine load), so that the supercharging by the large-sized turbocharger 5a and the supercharging by the small-sized turbocharger 5b are switched.

In addition, the engine system 200 of the present embodiment further includes an EGR system 43. The EGR system 43 has: an EGR passage 43a connecting the exhaust passage 41 on a side upstream of the turbine of the turbocharger 5 and the intake passage 1 on a side downstream of the compressor of the turbocharger 5 (more specifically, on a side downstream of the intercooler 8); an EGR cooler 43b configured to cool the exhaust gas passing through the EGR passage 43a; a first EGR valve 43c configured to adjust a flow amount of the exhaust gas passing through the EGR passage 43a; an EGR-cooler bypass passage 43d configured to bypass the EGR cooler 43b and cause the exhaust gas to flow therethrough; and a second EGR valve 43e configured to adjust a flow amount of the exhaust gas passing through the EGR-cooler bypass passage 43d.

<Electric Structure and Function of PCM>

Figure 2:
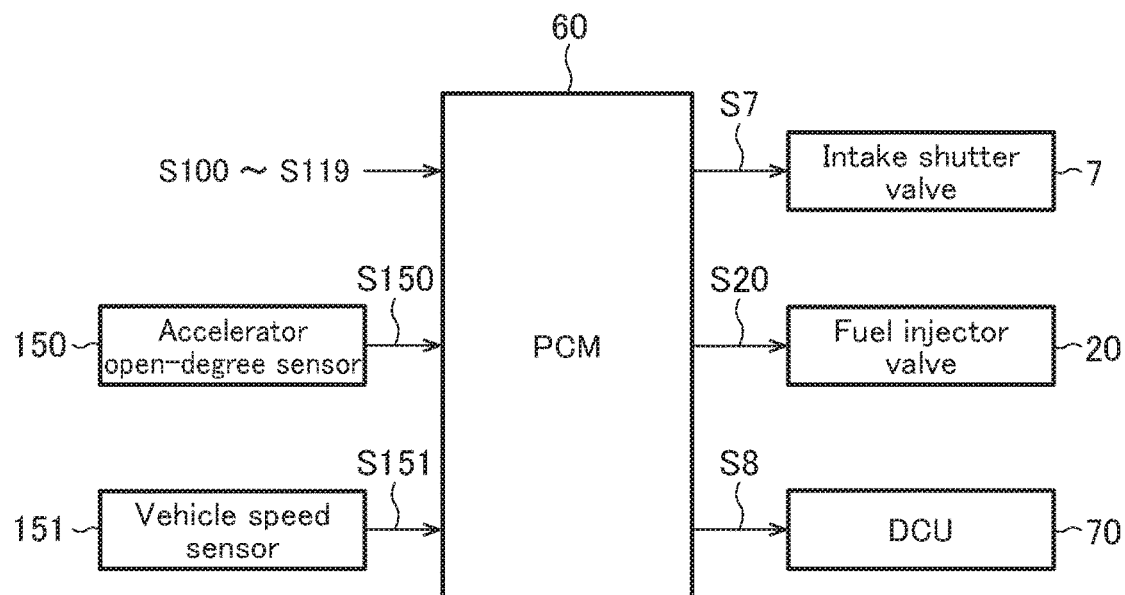
FIG. 2 is a block diagram showing an electric structure of the exhaust gas purification controller for the engine according to the present embodiment.

Next, with reference to FIG. 2, an electric structure of the exhaust gas purification controller for the engine according to the present embodiment is explained. FIG. 2 is a block diagram showing an electric structure of the exhaust gas purification controller for the engine according to the present embodiment.

The PCM 60 of the present embodiment is configured to output a control signal S20 to control the fuel injector valve 20 and a control signal S7 to control the intake shutter valve 7, based on a detection signal S150 outputted from an accelerator open-degree sensor 150 configured to detect an open degree of an accelerator pedal (accelerator open degree) and a detection signal S151 outputted from a vehicle speed sensor 151 configured to detect a vehicle speed, in addition to the detection signals S100 to S119 of the above various sensors 100 to 119.

In addition, the PCM 60 is configured to two-way communicate with the DCU 70 and to output a control signal S8 for causing the DCU 70 to perform such a control that a desired amount of urea is supplied from the urea injector 51.

In particular, the PCM 60 of the present embodiment is configured to control the fuel injection valve 20 in the engine E to bring the air-fuel ratio of the exhaust gas flowing into the $NO_x$ catalyst 45 into a rich state (the PCM 60 is configured to serve as an $NO_x$ catalyst regenerator) when an amount of $NO_x$ occluded in the $NO_x$ catalyst 45 becomes equal to or larger than a predetermined threshold. More specifically, the PCM 60 of the present embodiment is configured to perform a "post injection" from the fuel injection valve 20 in order to bring the air-fuel ratio of the exhaust gas into a target air-fuel ratio (specifically, a predetermined air-fuel ratio in a vicinity of a stoichiometric air-fuel ratio or smaller than a stoichiometric air-fuel ratio). Thereby, the $NO_x$ that has been occluded in the $NO_x$ catalyst 45 can be reduced ($NO_x$ reduction control).

That is, the PCM 60 of the present embodiment is configured to perform a main injection in which the fuel is injected into a cylinder to output an engine torque based on a driver's operation of the accelerator pedal (basically, in the main injection, an injection amount of the fuel or the like is determined such that the air-fuel ratio of the exhaust gas is in a lean state), and to perform a post injection at a timing not contributing to the output of the engine torque (specifically, at an expansion stroke) after the main injection in order to bring the air-fuel ratio of the exhaust gas into a state wherein the air-fuel ratio of the flowing-in exhaust gas is in a vicinity of the stoichiometric air-fuel ratio ($\lambda \approx 1$) or into a rich state wherein the air-fuel ratio of the exhaust gas is smaller than the stoichiometric air-fuel ratio ($\lambda < 1$), so as to reduce the $NO_x$ that has been occluded in the $NO_x$ catalyst 45. (Conventionally, such a control for reducing the $NO_x$ that has been occluded in the $NO_x$ catalyst 45 is called a "$DeNO_x$ control".)

The PCM 60 consists of a computer including: a CPU, various types of programs configured to be interpreted and executed by the CPU (including a basic control program such as an OS, and an application program to be executed on such an OS for achieving a specific function), and an inside memory such as ROM and/or RAM for storing such programs and/or various data.

<Fuel Injection Control>

Next, an operational flow of the fuel injection control in the present embodiment is explained. The flow of the fuel injection control is started when an ignition switch of the vehicle is turned on to power the PCM 60, and is repeatedly performed in a predetermined cycle.

First, the PCM 60 obtains a driving state of the vehicle. Specifically, the PCM 60 obtains at least the accelerator open degree detected by the accelerator open-degree sensor 150, the vehicle speed detected by the vehicle speed sensor 151, the crank angle detected by the crank-angle sensor 100, and a current gear position that has been set at a transmission of the vehicle.

Subsequently, the PCM 60 sets a target acceleration based on the obtained driving state of the vehicle. Specifically, the PCM 60 selects an acceleration performance map corresponding to the current vehicle speed and the current gear position among a plurality of acceleration performance maps defined for various vehicle speeds and various gear positions (made in advance and stored in a memory or the like), and determines a target acceleration corresponding to the current accelerator open degree with reference to the selected acceleration performance map.

Subsequently, the PCM 60 determines a target torque of the engine E for achieving the target acceleration. In this case, the PCM 60 determines the target torque within a torque range that the engine E can output, based on the current vehicle speed, the current gear position, the current road gradient, the current road surface μ, or the like.

Subsequently, the PCM 60 determines a fuel injection amount to be injected from the fuel injector valve 20, based on the target torque and the current engine rotation speed. The fuel injection amount is a fuel injection amount applied in the main injection (main injection amount).

On the other hand, in parallel to the above flow from the setting step of the target acceleration until the calculating step of the fuel injection amount, the PCM 60 sets a fuel injection pattern based on the driving state of the engine E. Specifically, the PCM 60 sets a fuel injection pattern applied in the post injection for a case wherein the $DeNO_x$ control is performed.

In the case, the PCM 60 determines a fuel injection amount applied in the post injection (post injection amount) and/or a timing at which the post injection is performed (post injection timing). The details are explained in the following item <$DeNO_x$ Control>.

The PCM 60 controls the fuel injection valve 20 based on the calculated main injection amount and the set fuel injection pattern (including the post injection amount and the post injection timing when the post injection is performed). That is, the PCM 60 controls the fuel injection valve 20 such that a desired amount of fuel is injected according to a desired fuel injection pattern.

<$DeNO_x$ Control>

The PCM 60 of the present embodiment is configured to perform a $DeNO_x$ control in which the fuel injection valve 20 executes a post injection so that the air-fuel ratio of the exhaust gas is continuously set to a target air-fuel ratio, which is in a vicinity of the stoichiometric air-fuel ratio or smaller than the stoichiometric air-fuel ratio, in order to lower the amount of the $NO_x$ occluded in the $NO_x$ catalyst 45 to almost zero, when the amount of the $NO_x$ occluded in the $NO_x$ catalyst 45 is larger than a predetermined amount, typically when the amount of the occluded $NO_x$ is in a vicinity of a limit value (hereinafter, called "active $DeNO_x$ control"). Thereby, the $NO_x$ whose large amount has been occluded in the $NO_x$ catalyst 45 is forcibly reduced, so that purification performance of the $NO_x$ by the $NO_x$ catalyst 45 is securely assured.

In addition, the PCM 60 of the present embodiment is configured to perform another $DeNO_x$ control in which the fuel injection valve 20 executes a post injection so that the air-fuel ratio of the exhaust gas is temporarily set to a target air-fuel ratio, in order to reduce the $NO_x$ occluded in the $NO_x$ catalyst 45, when the vehicle is accelerated and the air-fuel ratio of the exhaust gas is changed into a rich side, even when the amount of the $NO_x$ occluded in the $NO_x$ catalyst 45 is not larger than the predetermined amount (hereinafter, called "passive $DeNO_x$ control"). In the passive $DeNO_x$ control, using a state wherein the main injection amount is increased and the air-fuel ratio of the exhaust gas is decreased, such as an accelerating state, the post injection is executed so that the air-fuel ratio of the exhaust gas is set to a target air-fuel ratio which is in a vicinity of the stoichiometric air-fuel ratio or smaller than the stoichiometric air-fuel ratio. Thus, compared with a $DeNO_x$ control in a state wherein the air-fuel ratio of the exhaust gas is not decreased (that is, a not-accelerating state), the post injection amount required for setting the air-fuel ratio to the target air-fuel ratio is smaller. In addition, the passive $DeNO_x$ control is performed during each acceleration, so that it is expected that the passive $DeNO_x$ control is performed relatively often.

In the present embodiment, since such a passive $DeNO_x$ control is applied, the $DeNO_x$ control can be performed with a high frequency while preventing deterioration of fuel efficiency, which might be caused by any other $DeNO_x$ control. It takes only a relatively short time to perform each passive $DeNO_x$ control. However, since the passive $DeNO_x$ control is performed with a high frequency, the amount of the $NO_x$ occluded in the $NO_x$ catalyst 45 can be efficiently lowered. As a result, the amount of the $NO_x$ occluded in the $NO_x$ catalyst 45 is not likely to be larger than the predetermined amount, so that performance frequency of the active $DeNO_x$ control, which requires a post injection amount larger than that for the passive $DeNO_x$ control, can be lowered. This makes it possible to effectively improve the deterioration of fuel efficiency.

In addition, the PCM 60 of the present embodiment sets the air-fuel ratio of the exhaust gas to a target air-fuel ratio, by burning the post-injected fuel in a cylinder of the engine E, when the above active $DeNO_x$ control is performed. In this case, the PCM 60 performs the post injection at a timing when the post-injected fuel is burned in the cylinder. Specifically, the PCM 60 sets a predetermined timing within a former half of the expansion stroke of the engine E as a timing for the post injection in the active $DeNO_x$ control. The injection timing is for example ATDC45° C.A. Since such a timing for the post injection is applied for the active $DeNO_x$ control, it is prevented that the post-injected fuel is discharged as unburned fuel (that is, HC) and/or that the post-injected fuel dilutes oil.

On the other hand, the PCM 60 of the present embodiment sets the air-fuel ratio of the exhaust gas to a target air-fuel ratio, by discharging the post-injected fuel to the exhaust passage 41 as unburned fuel without burning in the cylinder of the engine E, when the above passive $DeNO_x$ control is performed. In this case, the PCM 60 performs the post injection at a timing when the post-injected fuel is not burned in the cylinder but discharged to the exhaust passage 41 as unburned fuel. Specifically, the PCM 60 sets a predetermined timing within a latter half of the expansion stroke of the engine E as a timing for the post injection in the passive $DeNO_x$ control. The injection timing is for example ATDC110° C.A. In principle, the timing for the post injection in the passive $DeNO_x$ control is set on a lag side with respect to the timing for the post injection in the active $DeNO_x$ control. Since such a timing for the post injection is applied for the passive $DeNO_x$ control, it is prevented that the post-injected fuel is burned in the cylinder to generate smoke (soot).

<Driving Ranges for Performing Passive $DeNO_x$ Control and Active $DeNO_x$ Control>

Figure 3:
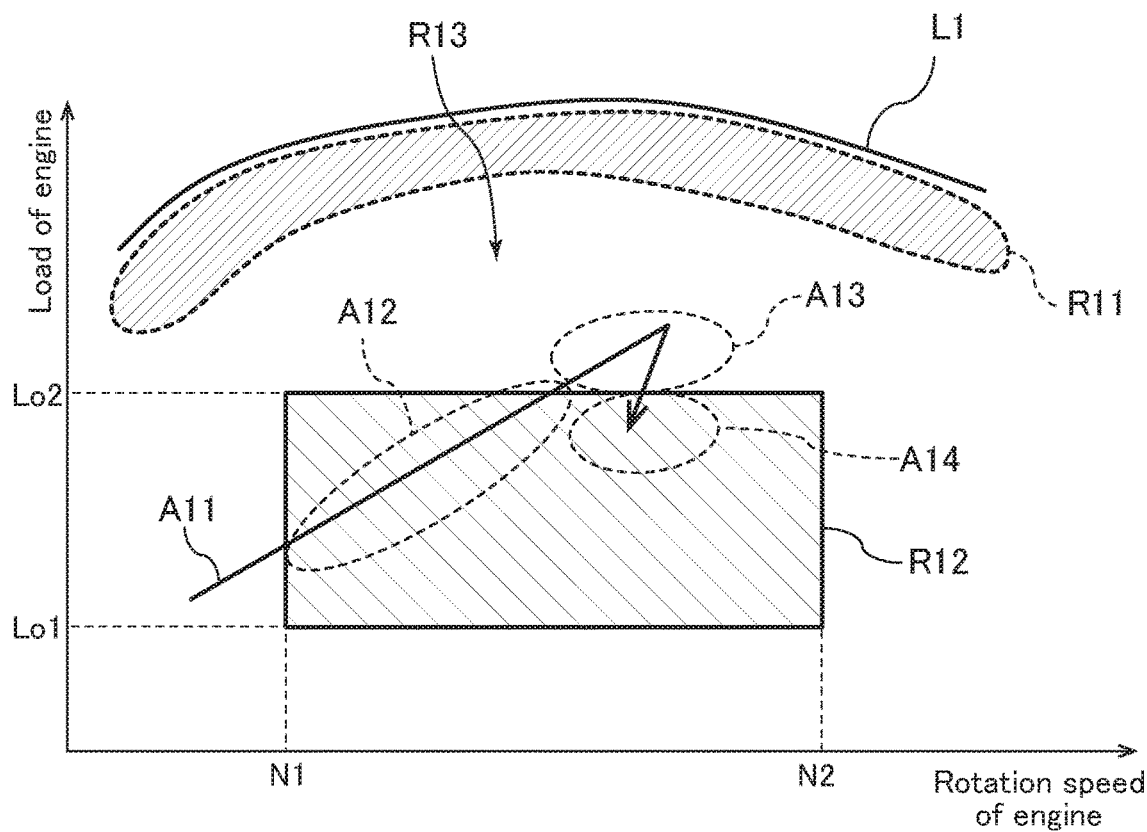
FIG. 3 is an explanatory view of driving ranges of the engine which respectively perform a passive $DeNO_x$ control and an active $DeNO_x$ control in the present embodiment.

Herein, with reference to FIG. 3, explained are driving ranges of the engine E in which the passive $DeNO_x$ control and the active $DeNO_x$ control are respectively performed. In FIG. 3, the engine rotational speed is shown along the horizontal axis, and the engine load is shown along the vertical axis. In addition, the curve line L1 shows a maximum torque line of the engine E.

As shown in FIG. 3, the PCM 60 of the present embodiment performs the active $DeNO_x$ control when the engine load is within a middle load range which is greater than a first predetermined load Lo1 and smaller than a second predetermined load Lo2 (> the first predetermined load Lo1) and when the engine rotation speed is within a middle rotation speed range greater than a first predetermined rotation speed N1 and smaller than a second rotation speed N2 (> the first predetermined rotation speed N1), i.e., when the engine load and the engine rotation speed are included in a driving range shown by the sign R12 (hereinafter, called "active $DeNO_x$ performing range R12"). The reasons why such an active $DeNO_x$ performing range R12 is adopted are as follows.

As described above, when the active $DeNO_x$ control is performed, the post injection is executed at a timing at which the post-injected fuel is burned in the cylinder in view of inhibiting generation of HC, which might be caused by the post-injected fuel being discharged as it is, and also inhibiting oil dilution, which might be caused by the post-injected fuel. In the present embodiment, when the post-injected fuel is burned, generation of smoke is inhibited, and generation of HC (that is, discharging unburned fuel that might be caused by incomplete combustion) is also inhibited. Specifically, a time period until the post-injected fuel is burned is secured as long as possible, so that ignition happens in a state the air and the fuel are suitably mixed. This inhibits the generation of smoke and HC. Thus, when the active $DeNO_x$ control is performed, a suitable amount of EGR gas is introduced, which effectively lags the ignition of the post-injected fuel.

The reasons why the generation of HC is to be inhibited in the active $DeNO_x$ control are to prevent the gas passage from clogging by the soot bonded with the HC which serves as a binder, when the EGR gas is introduced as described above and the HC is circulated into the intake system IN as (a part of) the EGR gas. In addition, the reasons are to prevent the HC from being discharged without being purified, when the active $DeNO_x$ control is performed in a driving region wherein the temperature of the $NO_x$ catalyst 45 is so low that purification performance of HC (purification performance of HC by the DOC 45a in the $NO_x$ catalyst 45) is not assured. (The active $DeNO_x$ performing range R12 may include such an area wherein the temperature of the $NO_x$ catalyst 45 is so low that purification performance of HC is not assured.)

In addition, the reasons why the generation of smoke is to be inhibited in the active $DeNO_x$ control are to inhibit deterioration of the fuel efficiency, which might be caused if DPF regeneration (which controls a post injection similarly to the $DeNO_x$ control) for burning and removing the PM collected by the DPF 46 is performed with a high frequency, although the PM corresponding to the smoke is collected by the DPF 46.

Herein, when the engine load is high, air introduced into the engine E is throttled to achieve a target air-fuel ratio, which causes shortage of oxygen necessary to suitably burn the post-injected fuel, and thus the smoke and/or the HC are likely to be generated. In particular, when the engine load is high, the temperature of the inside of the cylinder becomes high, which makes it impossible to suitably secure the time period until the post-injected fuel is ignited. That is, combustion may happen in a state the air and the fuel are not suitably mixed, which may generates the smoke and/or the HC. On the other hand, when the engine load is within a considerably low range, the temperature of the $NO_x$ catalyst 45 is so low that the $NO_x$ reduction function of the $NO_x$ catalyst 45 cannot be sufficiently exerted. In addition, in this range, the post-injected fuel is not suitably burned, that is, misfire may happen.

In the above, phenomena regarding the engine load are explained, but similar phenomena happen regarding the engine rotation speed.

As stated above, according to the present embodiment, the driving range of the engine E corresponding to the middle load range and the middle rotation speed range is adopted as the active $DeNO_x$ performing range R12 for performing an active $DeNO_x$ control. In other words, according to the present embodiment, an active $DeNO_x$ control is performed only in the active $DeNO_x$ performing range R12. An active $DeNO_x$ control is forbidden in a driving range out of the active $DeNO_x$ performing range R12. In the driving range of the engine E in which the active $DeNO_x$ control is forbidden, in particular in a range which is on a higher load or higher rotation speed side compared with the active $DeNO_x$ performing range R12 (a range shown by the sign R13), the purification performance of the $NO_x$ by the SCR catalyst 47 is sufficiently assured. Thus, the $NO_x$ is purified by the SCR catalyst 47, which can prevent the $NO_x$ from being discharged from the vehicle without performing the $DeNO_x$ control.

In addition, in the present embodiment, in a range which is on a further higher load side compared with the range R13 for purifying the $NO_x$ by the SCR catalyst 47 (a range shown by the sign R11, hereinafter called "passive $DeNO_x$ performing range R11"), the amount of the exhaust gas is so larger that the $NO_x$ is not fully purified by the SCR catalyst 47, and thus the passive $DeNO_x$ control is performed. In the passive $DeNO_x$ control, as described above, the post injection is performed at a timing when the post-injected fuel is not burned in the cylinder but discharged to the exhaust passage 41 as unburned fuel. In the passive $DeNO_x$ performing range R11, the temperature of the $NO_x$ catalyst 45 is so high that the purification performance of the HC (purification performance of the HC by the DOC 45a in the $NO_x$ catalyst 45) is secured. Thus, the so discharged unburned fuel can be securely purified by the $NO_x$ catalyst 45.

In the passive $DeNO_x$ control, if the post-injected fuel is burned in the cylinder in the same way as in the active $DeNO_x$ control, the smoke may be generated. The reasons are the same as those why the active $DeNO_x$ control is forbidden when the engine load is high.

Herein, explained is a specific example of the active $DeNO_x$ control when the driving state of the engine changes as shown by the arrow A11 in FIG. 3. First, when the driving state of the engine E goes into the active $DeNO_x$ performing range R12 (see the sign A12), the PCM 60 performs the active $DeNO_x$ control. Then, when the driving state of the engine E goes out from the active $DeNO_x$ performing range R12 (see the sign A13), the PCM 60 stops the active $DeNO_x$ control temporarily. In this state, the SCR catalyst 47 purifies the $NO_x$. Then, when the driving state of the engine E goes into the active $DeNO_x$ performing range R12 again (see the sign A14), the PCM 60 resumes the active $DeNO_x$ control. Accordingly, the active $DeNO_x$ control is not finished until the amount of the $NO_x$ that has been occluded in the $NO_x$ catalyst 45 is lowered to almost zero.

<Relationship Between Purification Performance and Temperature Range of Respective Catalysts>

Figure 4:
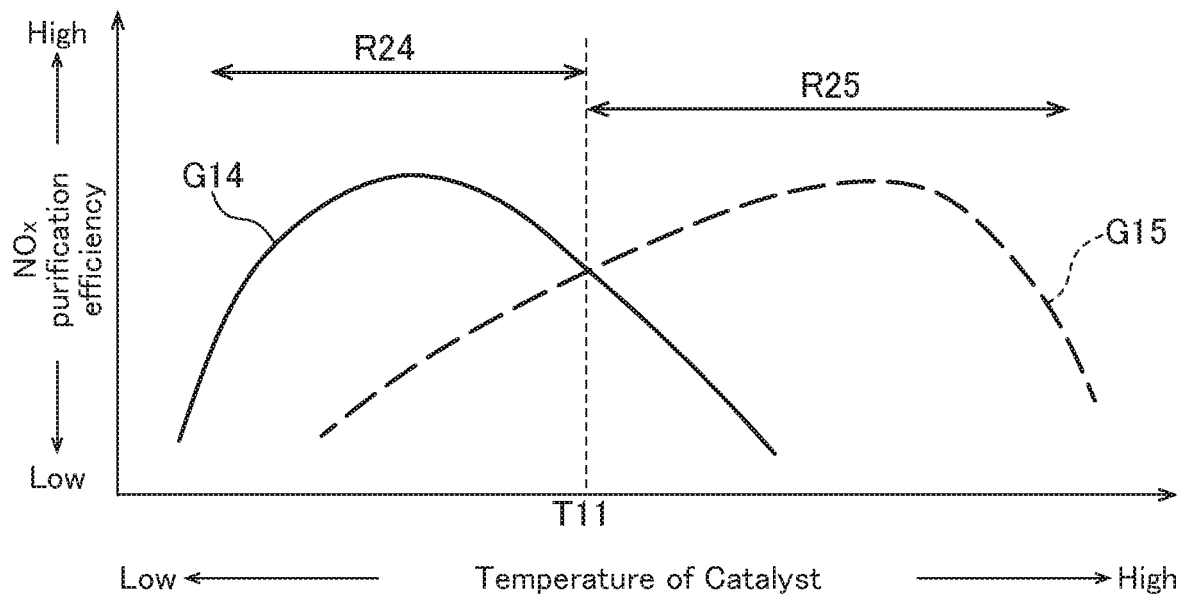
FIG. 4 is an explanatory view of a relationship between purification effects and temperature ranges.

As shown in FIG. 4, basically, the $NO_x$ catalyst 45 exerts the purification performance of the $NO_x$ in a relatively low temperature range (in a range shown by the sign R24), and the SCR catalyst 47 exerts the purification performance of the $NO_x$ in a higher temperature range (in a range shown by the sign R25) compared with the temperature range in which the $NO_x$ catalyst 45 exerts the purification performance of the $NO_x$. In the present embodiment, a temperature in a vicinity of the lower border of the temperature range in which an $NO_x$ purification rate equal to or larger than a predetermined value can be obtained by the SCR catalyst 47 is used as a judgement temperature (hereinafter, called "SCR judgment temperature").

<Post Injection Amount>

Next, explained is a calculation flow of the post injection amount to be applied in the $DeNO_x$ control (hereinafter, called "post injection amount for $DeNO_xI$") in the present embodiment. The calculation flow of the post injection amount for $DeNO_x$ is repeatedly performed in a predetermined cycle, in parallel to the above flow of the fuel injection control. That is, the post injection amount for $DeNO_xI$ is calculated at any time while the fuel injection control is performed.

First, the PCM 60 obtains the driving state of the engine E. Specifically, the PCM 60 obtains at least an amount of the intake air detected by the air flow sensor 101, oxygen density detected by the O2 sensor 111 and a main injection amount calculated by the flow of the fuel injection control. In addition, the PCM 60 obtains an amount of the exhaust gas circulated into the intake system IN by the EGR system 43 (an amount of the EGR gas), which is obtained by a predetermined model or the like. Furthermore, the PCM 60 obtains an $NH_3$ absorption amount that is an amount of the $NH_3$ absorbed in (sticking to) the SCR catalyst 47. As the $NH_3$ absorption amount, an estimated value of an amount of the $NH_3$ is used, which is estimated at any time based on: a urea injection amount injected from the urea injection valve; a generation amount of the $NH_3$ generated in the $DeNO_x$ control; and an estimated value of an amount of the $NO_x$ supplied to the SCR catalyst estimated based on the driving state of the engine and the purification efficiency of the $NO_x$ catalyst. However, the $NH_3$ absorption amount may be obtained by another method. For example, the SCR catalyst 47 may be provided with an $NH_3$-absorption-amount detecting sensor 47n configured to detect an $NH_3$ absorption amount.

Subsequently, the PCM 60 sets a target air-fuel ratio to be applied for reducing the $NO_x$ that has been occluded in the $NO_x$ catalyst 45, based on the estimated $NH_3$ absorption amount of the SCR catalyst 47. Specifically, the PCM 60 sets a target air-fuel ratio to be applied for performing an active $DeNO_x$ control and a target air-fuel ratio to be applied for performing a passive $DeNO_x$ control, respectively, based on the $NH_3$ absorption amount of the SCR catalyst 47. The setting method of the target air-fuel ratio(s) is explained later with reference to FIG. 5.

Subsequently, the PCM 60 calculates a post injection amount (post injection amount for $DeNO_x$) required to achieve the set target air-fuel ratio. That is, the PCM 60 determines how much the post injection amount should be applied in addition to the main injection amount in order to bring the air-fuel ratio of the exhaust gas into the target air-fuel ratio. In this case, the PCM 60 calculates a post injection amount for achieving a set target air-fuel ratio for performing an active $DeNO_x$ control and a post injection amount for achieving a set target air-fuel ratio for performing a passive $DeNO_x$ control, respectively.

<Setting of Target Air-Fuel Ratio>

Figure 5:
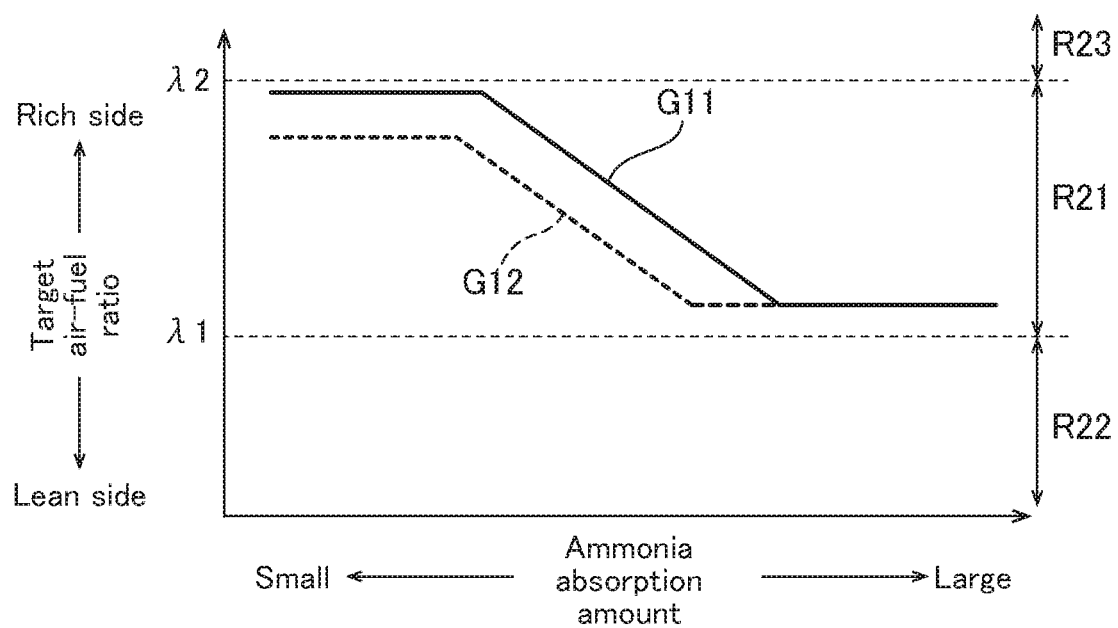
FIG. 5 is an explanatory view of a setting method of a target air-fuel ratio according to an embodiment of the present invention.

FIG. 5 is an explanatory view of a setting method of a target air-fuel ratio according to the present embodiment. In FIG. 5, the $NH_3$ absorption amount of the SCR catalyst 47 is shown along the horizontal axis, and the target air-fuel ratio is shown along the vertical axis.

In FIG. 5, "λ1" represents a stoichiometric air-fuel ratio. An air-fuel ratio range R21 on a rich side of the stoichiometric air-fuel ratio $\lambda 1$ represents a range in which the $NO_x$ occluded in the $NO_x$ catalyst 45 can be reduced, and another air-fuel ratio range R22 on a lean side of the stoichiometric air-fuel ratio $\lambda 1$ represents a range in which the $NO_x$ occluded in the $NO_x$ catalyst 45 cannot be reduced. In addition, in an air-fuel ratio range R23 on a rich side of a limit air-fuel ratio $\lambda 2$, unburned fuel may be supplied to the EGR system 43, which may result in deterioration of reliability of the EGR system 43.

A graph G11 shows a target air-fuel ratio to be set based on an $NH_3$ absorption amount of the $NH_3$ absorbed (stuck) in the SCR catalyst 47, when a passive $DeNO_x$ control is performed. A graph G12 shows a target air-fuel ratio to be set based on an $NH_3$ absorption amount of the $NH_3$ absorbed (stuck) in the SCR catalyst 47, when an active $DeNO_x$ control is performed.

When a target air-fuel ratio is set on a richer side in the range R21, the amount of HC and/or $H_2O$, that is, the total amount of the "H" components, supplied to the $NO_x$ catalyst 45 is increased, which results in increase of the $NH_3$ generation amount of the $NH_3$ generated from the $NO_x$ catalyst 45.

In the graphs G11 and G12, when the $NH_3$ absorption amount of the SCR catalyst 47 is relatively small, the target air-fuel ratio is set in a vicinity of the limit air-fuel ratio $\lambda 2$, in order to increase the total amount of the "H" components in the exhaust gas and thus increase the $NH_3$ generation amount of the $NH_3$ generated from the SCR catalyst 47.

On the other hand, in the graphs G11 and G12, when the $NH_3$ absorption amount of the SCR catalyst 47 is relatively large, the target air-fuel ratio is set at a ratio relatively closer to the stoichiometric air-fuel ratio $\lambda 1$, dependently on the $NH_3$ absorption amount in the SCR catalyst 47. Thereby, it can be inhibited that the $NH_3$ generated from the $NO_x$ catalyst 45 by the $DeNO_x$ control is not fully absorbed by the SCR catalyst 47 to be discharged.

<Specific Example of Setting of Active $DeNO_x$ Control Performing Flag>

Next, a specific example of setting an active $DeNO_x$ control performing flag is explained. A flow of setting an active $DeNO_x$ control performing flag is repeatedly performed in a predetermined cycle by the PCM 60 or the like, in parallel to the above flow of the fuel injection control or the like.

First, the PCM obtains various information of the vehicle. Specifically, the PCM 60 obtains at least a temperature of the $NO_x$ catalyst 45, a temperature of the SCR catalyst 47, and an $NO_x$ occlusion amount of the $NO_x$ catalyst 45. In this case, the temperature of the $NO_x$ catalyst 45 is estimated based on the temperature detected by the temperature sensor 112 located on the side just upstream of the $NO_x$ catalyst 45. The temperature of the SCR catalyst 47 is estimated based on the temperature detected by the temperature sensor 117 located on the side just upstream of the SCR catalyst 47. In addition, an amount of $NO_x$ in the exhaust gas is estimated based on the driving state of the engine E, the flow amount of the exhaust gas, the temperature of the exhaust gas and the like, and then the $NO_x$ occlusion amount is estimated by adding up the amount of $NO_x$ in the exhaust gas.

Subsequently, the PCM 60 judges whether the obtained SCR temperature is smaller than the SCR judgment temperature (for example, 300° C.). When the judgment result is NO, the PCM 60 judges whether the flow amount of the exhaust gas is smaller than a predetermined value.

When the SCR temperature is smaller than the SCR judgment temperature, or when the SCR temperature is not smaller than the SCR judgment temperature and the flow amount of the exhaust gas is not smaller than a predetermined value, the PCM 60 judges whether a predetermined time period has passed after a start of the engine E. When the judgment result is YES, the PCM 60 sets "1" as the active $DeNO_x$ control performing flag, in order to allow a performance of the active $DeNO_x$ control. When the predetermined time period has not passed after the start of the engine E, the PCM 60 judges whether the $NO_x$ occlusion amount is not smaller than a first threshold (for example, 4 g). When the $NO_x$ occlusion amount is equal to or larger than the first threshold, the PCM 60 sets "1" as the active $DeNO_x$ control performing flag, in order to allow a performance of the active $DeNO_x$ control. Then, the process is completed.

When the SCR temperature is not smaller than the SCR judgment temperature and the flow amount of the exhaust gas is smaller than the predetermined value (in this case, the $DeNO_x$ control is performed mainly only by the SCR catalyst 47), or when the SCR temperature is smaller than the SCR judgment temperature and the predetermined time period has not passed after the start of the engine E and the $NO_x$ occlusion amount is smaller than the first threshold (in this case, it is judged that the $DeNO_x$ control of the $NO_x$ catalyst 45 is still unnecessary), the PCM 60 sets "0" as the active $DeNO_x$ control performing flag, in order to forbid a performance of the active $DeNO_x$ control. Then, the process is completed.

<Specific Example of Setting of Passive $DeNO_x$ Control Performing Flag>

Next, a specific example of setting a passive $DeNO_x$ control performing flag is explained. A flow of setting a passive $DeNO_x$ control performing flag is also repeatedly performed in a predetermined cycle by the PCM 60 or the like, in parallel to the above flow of the fuel injection control, the above flow of setting the active $DeNO_x$ control performing flag, or the like.

First, the PCM obtains various information of the vehicle. Specifically, the PCM 60 obtains at least a temperature of the $NO_x$ catalyst 45, a temperature of the SCR catalyst 47, a target torque determined by the above flow of the fuel injection control, a post injection amount for $DeNO_x$ calculated by the above calculation flow of the post injection amount for $DeNO_x$ (specifically, a post injection amount for $DeNO_x$ calculated to be applied in a passive $DeNO_x$ control), and an $NO_x$ occlusion amount of the $NO_x$ catalyst 45. The way how to obtain (determine) the temperature of the $NO_x$ catalyst 45, the temperature of the SCR catalyst 47 and the $NO_x$ occlusion amount is the same as described for the active $DeNO_x$ control.

Subsequently, the PCM 60 judges whether the obtained SCR temperature is smaller than the SCR judgment temperature (for example, 300° C.). When the judgment result is NO, the PCM 60 judges whether the flow amount of the exhaust gas is smaller than a predetermined value.

When the SCR temperature is smaller than the SCR judgment temperature, or when the SCR temperature is not smaller than the SCR judgment temperature and the flow amount of the exhaust gas is not smaller than a predetermined value, the PCM 60 judges whether the $NO_x$ occlusion amount is not smaller than a second threshold (for example, 2 g). When the $NO_x$ occlusion amount is equal to or larger than the second threshold, the PCM 60 sets "1" as the passive $DeNO_x$ control performing flag, in order to allow a performance of the passive $DeNO_x$ control. Then, the process is completed.

When the SCR temperature is not smaller than the SCR judgment temperature and the flow amount of the exhaust gas is smaller than the predetermined value (in this case, the DeNO$_x$ control is performed mainly only by the SCR catalyst 47), or when the SCR temperature is smaller than the SCR judgment temperature and the NO$_x$ occlusion amount is smaller than the second threshold (in this case, it is judged that the DeNO$_x$ control of the NO$_x$ catalyst 45 is still unnecessary), the PCM 60 sets "0" as the passive DeNO$_x$ control performing flag, in order to forbid a performance of the passive DeNO$_x$ control.

Then, the process is completed.

<Active DeNO$_x$ Control According to the Present Embodiment>

Figure 6A:
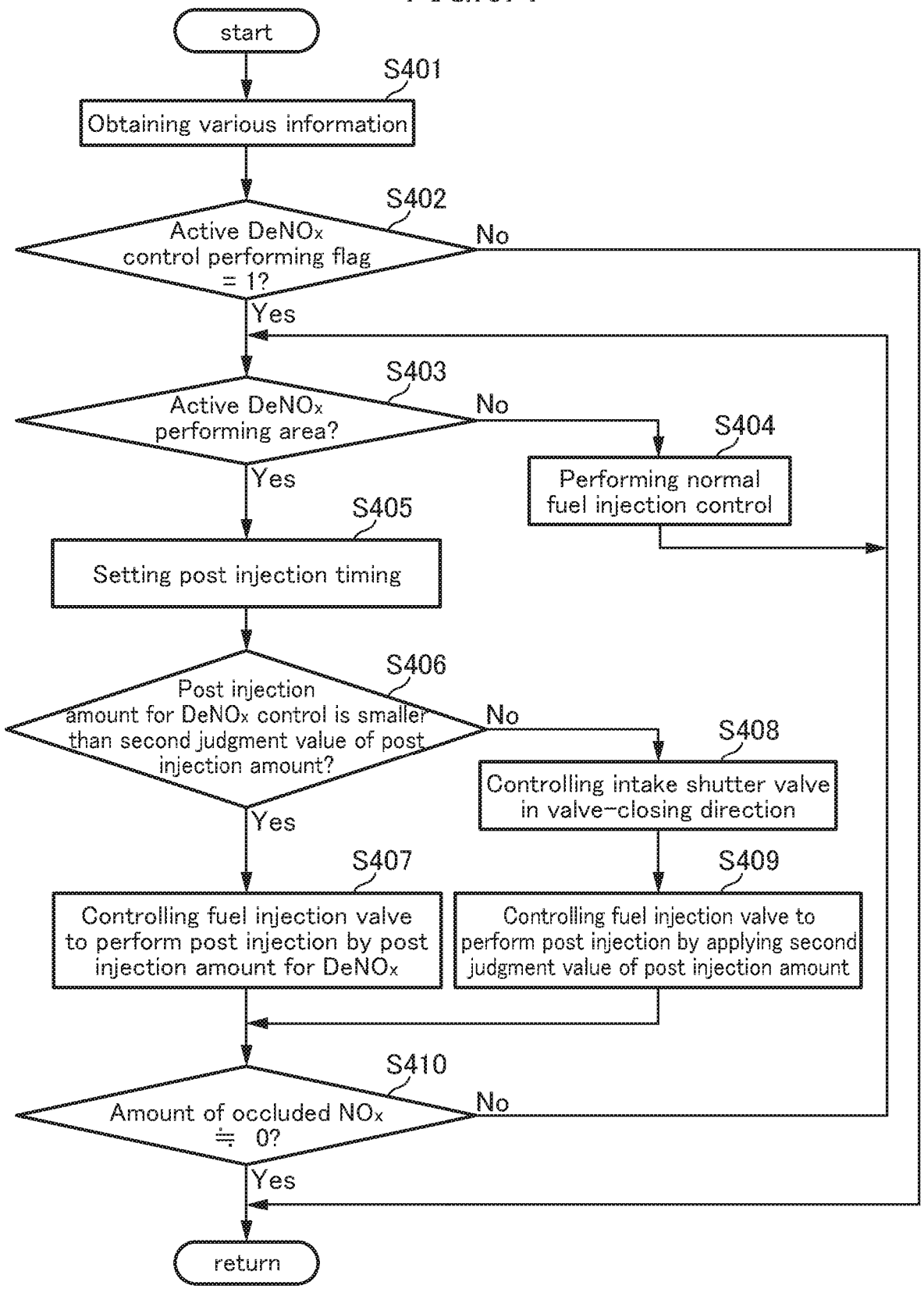
FIG. 6A is a flowchart showing an active $DeNO_x$ control and a passive $DeNO_x$ control according to an embodiment of the present invention.

Next, with reference to FIG. 6A, explained is an active DeNO$_x$ control according to the present embodiment, which is performed based on the active DeNO$_x$ control performing flag that has been set as described above. FIG. 6A is a flowchart showing an active DeNO$_x$ control according to the present embodiment (active DeNO$_x$ control flow). This active DeNO$_x$ control flow is repeatedly performed in a predetermined cycle by the PCM 60 or the like, in parallel to the above flow of the fuel injection control, the above flow of setting the active DeNO$_x$ control performing flag, or the like.

First, at a step S401, the PCM obtains various information of the vehicle. Specifically, the PCM 60 obtains at least a load of the engine, a rotation speed of the engine, a temperature of the NO$_x$ catalyst 45, a post injection amount for DeNO$_x$ calculated by the above calculation flow of the post injection amount for DeNO$_x$ (specifically, a post injection amount for DeNO$_x$ calculated to be applied in an active DeNO$_x$ control), and a value of the active DeNO$_x$ control performing flag set by the above flow of setting the active DeNO$_x$ control performing flag.

Subsequently, at a step S402, the PCM 60 judges whether the active DeNO$_x$ control performing flag obtained at the step S401 is "1" or not. That is, the PCM 60 judges whether the active DeNO$_x$ control should be performed or not. When the active DeNO$_x$ control performing flag is "1" (a step S402: Yes), the process proceeds to a step S403. On the other hand, when the active DeNO$_x$ control performing flag is "0" (a step S402: No), the process proceeds to FIG. 6B.

At the step S403, the PCM 60 judges whether the driving state of the engine (the load of the engine and the rotation speed of the engine) is included in the active DeNO$_x$ performing area R12 (see FIG. 3) or not. As a judgment result of the step S403, when the driving state of the engine is included in the active DeNO$_x$ performing area R12 (a step S403: Yes), the process proceeds to a step S405. On the other hand, when the driving state of the engine is not included in the active DeNO$_x$ performing area R12 (a step S403: No), the process proceeds to a step S404.

Subsequently, at the step S405, the PCM 60 sets a post injection timing (post injection time) to be applied in the active DeNO$_x$ control.

In the present embodiment, when the active DeNO$_x$ control is performed, the air-fuel ratio of the exhaust gas is set (adjusted) to the target air-fuel ratio by burning the post-injected fuel in the cylinder. In order to burn such post-injected fuel in the cylinder, it is sufficient to perform a post injection at a timing on a relatively advanced-angle side within the expansion stroke. However, if the post injection timing is at a too much advanced angle, ignition happens in a state wherein the air and the fuel are not suitably mixed to each other, which generates the smoke. Thus, in the present embodiment, the post injection timing is set on a suitably advanced-angle side. Specifically, a suitable timing within a first half of the expansion stroke is adopted as a post injection timing for the active DeNO$_x$ control. In addition, a suitable amount of the EGR gas is introduced during the active DeNO$_x$ control. For these reasons, the ignition of the post-injected fuel is lagged, which can inhibit generation of the smoke or the like.

With reference to FIG. 6A again, at the step S404, the PCM 60 performs a normal fuel injection control not including a post injection, without performing an active DeNO$_x$ control, that is, without performing a fuel injection control including a post injection in order to set (adjust) the air-fuel ratio of the exhaust gas to the target air-fuel ratio (step S404). Basically, the PCM 60 performs only a main injection control wherein an amount of fuel dependent on the target torque is main injected. In fact, the PCM 60 performs the process of the step S404 during the above flow of the fuel injection control. Then, the process goes back to the step S403 to make the above judgment of the step S403 again. That is, in a case wherein the active DeNO$_x$ control performing flag is "1", while the driving state of the engine is not included in the active DeNO$_x$ performing area R12, the PCM 60 performs the normal fuel injection control, and when the driving state of the engine goes into the active DeNO$_x$ performing area R12, the PCM 60 switches the normal fuel injection control into the fuel injection control of the active DeNO$_x$ control. For example, when the driving state of the engine goes out of the active DeNO$_x$ performing area R12 during the fuel injection control of the active DeNO$_x$ control, the PCM 60 stops the current fuel injection control and performs the normal fuel injection control. Subsequently, when the driving state of the engine goes into the active DeNO$_x$ performing area R12, the fuel injection control of the active DeNO$_x$ control is resumed.

Subsequently, at a step S406, the PCM 60 judges whether the post injection amount for DeNO$_x$ control obtained at the step S401 is smaller than a predetermined judgment value for post injection amount.

As a judgment result of the step S406, when the post injection amount for DeNO$_x$ control is smaller than the predetermined judgment value for post injection amount (step S406: Yes), the process proceeds to a step S407. At the step S407, the PCM 60 controls the fuel injection valve 20 in order to perform a post injection of the post injection amount for DeNO$_x$ obtained by the step S401. In fact, the PCM 60 performs the process of the step S407 during the above flow of the fuel injection control. Then, the process proceeds to a step S410.

On the other hand, when the post injection amount for DeNO$_x$ is not smaller than the judgment value for post injection amount (step S406: Yes), the process proceeds to a step S408. At the step S408, the PCM 60 performs a control of lowering oxygen density in the air introduced to the engine E, in order to set (adjust) the air-fuel ratio of the exhaust gas to the target air-fuel ratio by a post injection amount not beyond the judgment value for post injection amount (specifically, the judgment value for post injection amount itself is used as the post injection amount for DeNO$_x$). In this case, the PCM 60 performs at least one of: a control of driving the intake shutter valve 7 in a valve-closing direction (this is shown in FIG. 6); a control of increasing the amount of the EGR gas; and a control of lowering the supercharging pressure of the turbocharger 5; so that the oxygen density in the air introduced to the engine E is lowered, that is, a filing amount thereof is lowered. For example, the PCM 60 determines a supercharging pressure required to adjust the air-fuel ratio of the exhaust gas to the target air-fuel ratio by the post injection amount for DeNO$_x$ to which the judgment value for post injection amount has been applied, and controls the intake shutter valve 7 to a desired open degree in the valve-closing direction based on the actual supercharging pressure (the pressure detected by the pressure sensor 108) and the amount of the EGR gas, in order to achieve the required supercharging pressure. Then, the process proceeds to a step S409.

In addition, the intake shutter valve 7 is set to be fully open during a normal driving state of the engine E. On the other hand, during a DeNO$_x$ control, a DPF regeneration, an idle driving state, and the like, the intake shutter valve 7 is basically set to be at a base open degree that has been predetermined. During a driving state wherein no EGR gas is introduced, the intake shutter valve 7 is feedback controlled based on the supercharging pressure.

At the step S409, the PCM 60 applies the judgment value of post injection amount to the post injection amount for DeNO$_x$, that is, sets the post injection amount for DeNO$_x$ using the judgment value of post injection amount, and controls the fuel injection valve 20 in order to perform a post injection according to the currently set post injection amount for DeNO$_x$. In fact, the PCM 60 performs the process of the step S409 during the above flow of the fuel injection control. Then, the process proceeds to a step S410.

When the active DeNO$_x$ control is performed, the NO$_x$ catalyst 45 generates the NH$_3$ when reducing the NO$_x$ occluded therein as described above, and discharges the generated NH$_3$.

At the step S410, the PCM 60 judges whether the amount of the NO$_x$ that has been occluded in the NO$_x$ catalyst 45 is lowered to almost zero. When the NO$_x$ occlusion amount of the NO$_x$ catalyst 45 is lowered to almost zero (step S410: Yes), the process is finished. In this case, the PCM 60 finishes the active DeNO$_x$ control.

On the other hand, when the NO$_x$ occlusion amount of the NO$_x$ catalyst 45 is not lowered to almost zero (step S410: Yes), the process goes back to the step S403. In this case, the PCM 60 continues the active DeNO$_x$ control. That is, the PCM 60 continues the active DeNO$_x$ control until the amount of the NO$_x$ that has been occluded in the NO$_x$ catalyst 45 is lowered to almost zero. In particular, even when the conditions for performing the active DeNO$_x$ control become unfulfilled and the active DeNO$_x$ control is stopped, thereafter if the conditions for performing the active DeNO$_x$ control are fulfilled again, the DeNO$_x$ control is resumed so that the NO$_x$ occlusion amount of the NO$_x$ catalyst 45 is lowered to almost zero.

<Passive DeNO$_x$ Control According to the Present Embodiment>

Next, with reference to FIG. 6B, explained is a passive DeNO$_x$ control according to the present embodiment, which is performed based on the passive DeNO$_x$ control performing flag that has been set as described above. FIG. 6B is a flowchart showing a passive DeNO$_x$ control according to the present embodiment (passive DeNO$_x$ control flow). This passive DeNO$_x$ control flow is repeatedly performed in a predetermined cycle by the PCM 60 or the like, in parallel to the above flow of the fuel injection control, the above flow of setting the passive DeNO$_x$ control performing flag, or the like.

First, at a step S501, the PCM obtains various information of the vehicle. Specifically, the PCM 60 obtains at least a post injection amount for DeNO$_x$ calculated by the above calculation flow of the post injection amount for DeNO$_x$ (specifically, a post injection amount for DeNO$_x$ calculated to be applied in an passive DeNO$_x$ control), and a value of the passive DeNO$_x$ control performing flag set by the above flow of setting the passive DeNO$_x$ control performing flag.

Subsequently, at a step S502, the PCM 60 judges whether the passive DeNO$_x$ control performing flag obtained at the step S501 is "1" or not. That is, the PCM 60 judges whether the passive DeNO$_x$ control should be performed or not. When the passive DeNO$_x$ control performing flag is "1" (a step S502: Yes), the process proceeds to a step S503. On the other hand, when the passive DeNO$_x$ control performing flag is "0" (a step S502: No), the passive DeNO$_x$ control is not performed and the process is finished.

At the step S503, the PCM 60 controls the fuel injection valve 20 in order to perform a post injection of the post injection amount for DeNO$_x$ obtained by the step S501. That is, the passive DeNO$_x$ control is performed. In fact, the PCM 60 performs the process of the step S503 during the above flow of the fuel injection control. Then, the process proceeds to a step S502.

When the passive DeNO$_x$ control is performed, the NO$_x$ catalyst 45 generates the NH$_3$ when reducing the NO$_x$ occluded therein as described above, and discharges the generated NH$_3$.

At the step S504, the PCM 60 judges whether the passive DeNO$_x$ control performing flag has changed to "0" or not. As a result, if the passive DeNO$_x$ control performing flag has changed to "0" (step S504: Yes), the process is finished. In this case, the PCM 60 finishes the passive DeNO$_x$ control. On the other hand, if the passive DeNO$_x$ control performing flag has not changed to "0" (step S504: No), that is, if the passive DeNO$_x$ control performing flag is still maintained "1", the process goes back to the step S503. In this case, the PCM 60 continues the passive DeNO$_x$ control. That is, the PCM 60 continues the passive DeNO$_x$ control until the passive DeNO$_x$ control performing flag is switched from "1" to "0".

<Injection Control of Urea Injector>

Next, an injection control of the urea injector 51 according to the present embodiment is explained. The injection control is performed when the purification (reduction) of NO$_x$ by the SCR catalyst 47 is performed.

Specifically, the engine system 200 of the present embodiment is configured to perform the purification of NO$_x$, (1) mainly only by the SCR catalyst 47, when a flow amount of the exhaust gas detected by the exhaust-gas flow amount detecting sensor 45*f* is smaller than a predetermined threshold and when a temperature of the SCR catalyst 47 detected by the SCR-catalyst-temperature detecting sensor 47*t* is smaller than a predetermined threshold (for example, 300° C.); and (2) both by the NO$_x$ catalyst 45 and by the SCR catalyst 47, when a flow amount of the exhaust gas detected by the exhaust-gas flow amount detector sensor 45*f* is equal to or larger than the predetermined threshold.

When the purification of NO$_x$ is performed mainly only by the SCR catalyst 47, the injection control of the urea injector 51 is performed dependently on a difference between the current NH$_3$ absorption amount of the SCR catalyst 47 and a target NH$_3$ absorption amount.

When both the purification of NO$_x$ by the NO$_x$ catalyst 45 and the purification of NO$_x$ by the SCR catalyst 47 are performed, based on the flow shown in FIG. 7, a supply amount of the NH$_3$ from the NO$_x$ catalyst 45 to the SCR catalyst 47 is estimated, and a supply amount of the urea from the urea injector 51 is reduced and adjusted based on the estimation result. That is, on reflection of characteristics shown in FIGS. 8 to 12 and described below, using the temperature of the NO$_x$ catalyst 45, the flow amount of the exhaust gas, the air-fuel ratio of the exhaust gas (for example, A/F), a degree of thermal deterioration of the NO$_x$ catalyst, and the like, as an input value(s), a suitable supply amount of the NH$_3$ from the NO$_x$ catalyst 45 to the SCR catalyst 47 is calculated, and thus a suitable reduction amount of the supply amount of the urea is calculated.

Herein, as shown in FIG. 7, it is preferable that the DCU 70 has a first reduction amount determiner 71 configured to determine a reduction amount corresponding to a purification process of NO$_x$ that has been occluded in the NO$_x$ catalyst, and a second reduction amount determiner 72 configured to determine a reduction amount corresponding to a purification process of Raw NO$_x$. In this case, a reduction amount corresponding to the purification process of NO$_x$ that has been occluded in the NO$_x$ catalyst 45 and a reduction amount corresponding to the purification process of Raw NO$_x$ can be taken into consideration independently of each other.

The DCU 70 of the present embodiment is configured to reduce and adjust the supply amount of the urea to the SCR catalyst 47, based on the sum of the reduction amount determined by the first reduction amount determiner 71 and the reduction amount determined by the second reduction amount determiner 72.

For example, when both the SCR catalyst and the NO$_x$ catalyst are used, the injection amount of the urea injection valve is adjusted sequentially in conjunction with a DeNO$_x$ control of the NO$_x$ catalyst. When only the NO$_x$ catalyst is mainly used for the purification of NO$_x$, the injection amount of the urea injection valve is adjusted when the urea injection is started in an NO$_x$ purification range by the SCR catalyst. For example, when an amount of the NH$_3$ equal to or larger than the target NH$_3$ absorption amount is absorbed in (stuck to) the SCR catalyst due to the NH$_3$ introduction by the DeNO$_x$ control, the urea injection is limited until the amount of the NH$_3$ becomes smaller than the target NH$_3$ absorption amount. In addition, when the amount of the NH$_3$ is smaller than the target NH$_3$ absorption amount, the urea injection amount is adjusted so that it is reduced by the amount of the NH$_3$ introduced by the DeNO$_x$ control.

<(1) Control Considering Temperature of NO$_x$ Catalyst>

The DCU 70 of the present embodiment is configured to reduce and adjust the supply amount of the urea to the SCR catalyst 47 by the urea injector 51, in a state wherein the air-fuel ratio of the exhaust gas flowing into the NO$_x$ catalyst 45 is rich and the NO$_x$ occluded in the NO$_x$ catalyst 45 is reduced to N$_2$. Specifically, a reduction amount of the supply amount of the urea determined by the DCU 70 is set smaller when the temperature of the NO$_x$ catalyst 45 detected by the NO$_x$-catalyst-temperature detecting sensor 45*t* is higher.

In the present embodiment, the reduction amount of the supply amount of the urea determined by the DCU 70 is set to vary less greatly as the temperature of the NO$_x$ catalyst 45 detected by the NO$_x$-catalyst-temperature detecting sensor 45*t* varies, when the flow amount of the exhaust gas detected by the exhaust-gas flow amount detecting sensor 45*f* is larger.

In addition, in the present embodiment, the DCU 70 has the first reduction amount determiner 71 configured to determine a reduction amount corresponding to a purification process of NO$_x$ that has been occluded in the NO$_x$ catalyst 45, and the second reduction amount determiner 72 configured to determine a reduction amount corresponding to a purification process of Raw NO$_x$.

The reduction amount of the supply amount of the urea determined by the first reduction amount determiner 71 is set to vary more greatly, compared with the reduction amount of the supply amount of the urea determined by the second reduction amount determiner 72, as the temperature of the NO$_x$ catalyst 45 detected by the NO$_x$-catalyst-temperature detecting sensor 45*t* varies.

Each of the reduction amount of the supply amount of the urea determined by the first reduction amount determiner 71 and the reduction amount of the supply amount of the urea determined by the first reduction amount determiner 72 is set to vary less greatly as the temperature of the NO$_x$ catalyst 45 detected by the NO$_x$-catalyst-temperature detecting sensor 45*t* varies, when the flow amount of the exhaust gas detected by the exhaust-gas flow amount detecting sensor 45*f* is larger.

The reduction amount of the supply amount of the urea determined by the first reduction amount determiner 71 is set to vary more greatly, compared with the reduction amount of the supply amount of the urea determined by the second reduction amount determiner 72, as the flow amount of the exhaust gas detected by the exhaust-gas flow amount detecting sensor 45*f* varies. In the present embodiment, the reduction amount of the supply amount of the urea determined by the second reduction amount determiner 72 is set substantially constant no matter how the temperature of the NO$_x$ catalyst 45 detected by the NO$_x$-catalyst-temperature detecting sensor 45*t* varies.

The DCU 70 of the present embodiment is configured to reduce and adjust the supply amount of the urea to the SCR catalyst 47, based on the sum of the reduction amount of the supply amount of the urea determined by the first reduction amount determiner 71 and the reduction amount of the supply amount of the urea determined by the second reduction amount determiner 72.

Figure 8A:
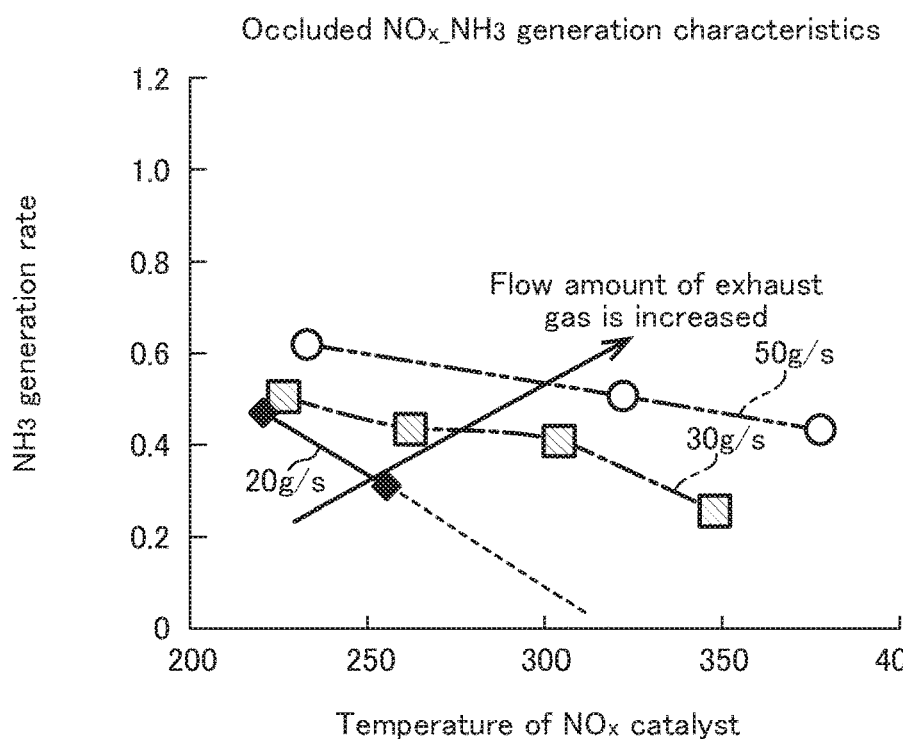
FIG. 8A is data of a generated amount of $NH_3$ generated in a purification process of $NO_x$ that has been occluded in an $NO_x$ catalyst, against variation of a temperature of $NO_x$ catalyst.
Figure 8B:
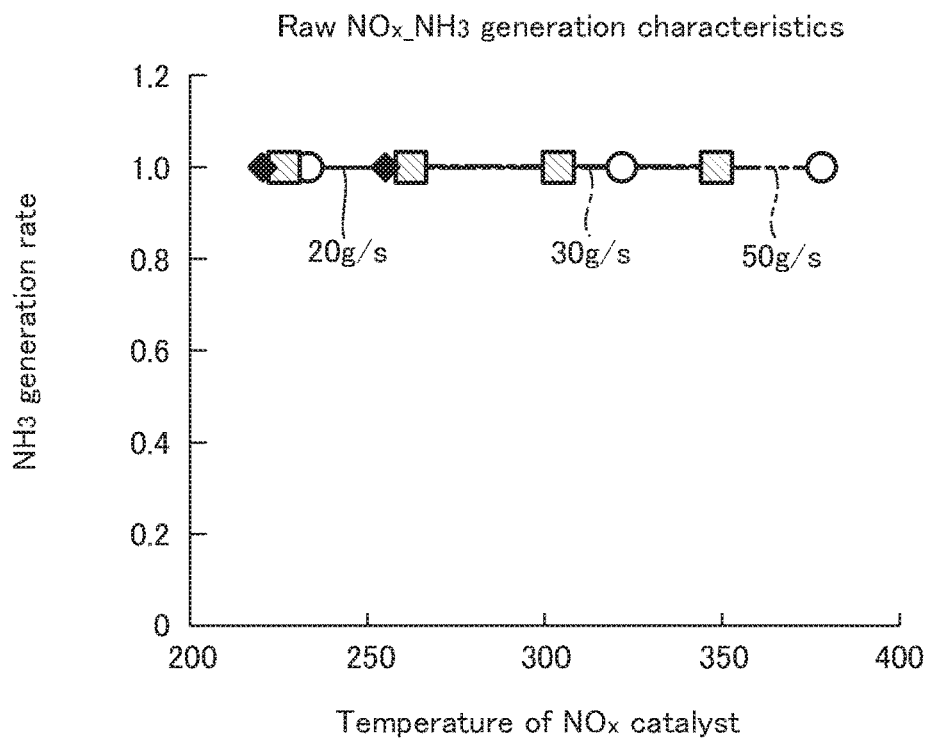
FIG. 8B is data of a generated amount of $NH_3$ generated in a purification process of Raw $NO_x$ discharged from the engine, against the variation of the temperature of $NO_x$ catalyst.

The above way for the DCU 70 to determine the reduction amount of the supply amount of the urea is based on experimental data shown in FIGS. 8A and 8B.

FIG. 8A shows data for an amount of the NH$_3$ (ammonia) generated in the purification process of the NO$_x$ that has been occluded in the NO$_x$ catalyst 45, when λ=0.94. There is tendency wherein, when the temperature of the NO$_x$ catalyst 45 is higher, the amount of the generated NH$_3$ is smaller. The inventors consider that the reason therefor is as follows. In the NO$_x$ catalyst 45, both a reaction generating NH$_3$ (for example, BaNO$_3$+CO+H$_2$→NH$_3$, NO+CO+H$_2$→NH$_3$) (conceptual formula) and a reaction consuming (decomposing) the NH$_3$ (BaNO$_3$+NH$_3$→N$_2$, NO+NH$_3$→N$_2$) (conceptual formula) occur, but the former reaction is more dominant than the latter one when the temperature of the NO$_x$ catalyst 45 is higher.

In addition, when the flow amount of the exhaust gas is increased from 20 g/s to 50 g/s, there is tendency wherein the amount of the generated NH$_3$ reduces less greatly (the gradient is smaller) as the temperature of the NO$_x$ catalyst 45 is raised.

In the first reduction amount determiner 71, a correspondence table (or function) is prepared in advance in which: characteristics as shown in FIG. 8A are reflected, and thus (the air-fuel ratio and) the temperature of the NO$_x$ catalyst 45 detected by the NO$_x$-catalyst-temperature detecting sensor 45*t* and the flow amount of the exhaust gas detected by the exhaust-gas flow amount detecting sensor 45*f* are input parameters while the reduction amount of the supply amount of the urea is an output parameter. This matches the contents described in the above paragraphs 0134 to 0137.

FIG. 8B shows data for an amount of the NH$_3$ (ammonia) generated in the purification process of the Raw NO$_x$ discharged from the engine, when λ=0.94. There is tendency wherein, when the temperature of the NO$_x$ catalyst 45 is higher, the amount of the generated NH$_3$ is reduced only slightly (it is difficult to visually recognize the reduction from the graph). The inventors consider that the reason therefor is as follows. Since the Raw $NO_x$ flows as the exhaust gas, differently from the $NO_x$ that has been occluded in the $NO_x$ catalyst 45 (which may cause a reaction consuming the $NH_3$ just after a reaction generating the $NH_3$), a reaction consuming the $NH_3$ is not likely to occur, even when the temperature of the catalyst 45 is higher.

In addition, even when the flow amount of the exhaust gas is increased from 20 g/s to 50 g/s, the amount of the generated $NH_3$ hardly changes (it is difficult to visually recognize the change from the graph).

In the second reduction amount determiner 72, a correspondence table (or function) is prepared in advance in which: characteristics as shown in FIG. 8B are reflected, and thus (the air-fuel ratio and) the temperature of the $NO_x$ catalyst 45 detected by the $NO_x$-catalyst-temperature detecting sensor 45t and the flow amount of the exhaust gas detected by the exhaust-gas flow amount detecting sensor 45f are input parameters while the reduction amount of the supply amount of the urea is an output parameter which is substantially constant. This matches the contents described in the above paragraphs 0134 to 0137.

<(2) Control Mainly Considering Flow Amount of Exhaust Gas>

The DCU 70 of the present embodiment is configured to reduce and adjust the supply amount of the urea to the SCR catalyst 47 by the urea injector 51, by mainly considering the flow amount of the exhaust gas, as an alternative to the above <(1) Control Considering Temperature of $NO_x$ catalyst>. Specifically, a reduction amount of the supply amount of the urea determined by the DCU 70 is set larger when the flow amount of the exhaust gas detected by the exhaust-gas flow amount detecting sensor 45f is larger.

In addition, when the flow amount of the exhaust gas detected by the exhaust-gas flow amount detecting sensor 45f is in a range equal to or larger than a predetermined first threshold (for example, 25 g/s), the reduction amount of the supply amount of the urea determined by the DCU 70 is set to vary less greatly, compared with in a range smaller than the first threshold, as the flow amount of the exhaust gas detected by the exhaust-gas flow amount detecting sensor 45f varies.

In addition, as described above, the DCU 70 in the present embodiment has the first reduction amount determiner 71 configured to determine a reduction amount corresponding to a purification process of $NO_x$ that has been occluded in the $NO_x$ catalyst 45, and the second reduction amount determiner 72 configured to determine a reduction amount corresponding to a purification process of Raw $NO_x$.

In addition, when the flow amount of the exhaust gas detected by the exhaust-gas flow amount detecting sensor 45f is in a range smaller than a predetermined second threshold (for example, 25 g/s), the reduction amount of the supply amount of the urea determined by the second reduction amount determiner 72 is set to vary more greatly, compared with the reduction amount of the supply amount of the urea determined by the first reduction amount determiner 71, as the flow amount of the exhaust gas detected by the exhaust-gas flow amount detecting sensor 45f varies.

To the contrary, when the flow amount of the exhaust gas detected by the exhaust-gas flow amount detecting sensor 45f is in a range equal to or larger than the predetermined second threshold, the reduction amount of the supply amount of the urea determined by the second reduction amount determiner 72 is set to vary less greatly, compared with the reduction amount of the supply amount of the urea determined by the first reduction amount determiner 71, as the flow amount of the exhaust gas detected by the exhaust-gas flow amount detecting sensor 45f varies.

In the present embodiment, when the flow amount of the exhaust gas detected by the exhaust-gas flow amount detecting sensor 45f is in the range equal to or larger than the predetermined second threshold, the reduction amount of the supply amount of the urea determined by the second reduction amount determiner 72 is set substantially constant no matter how the flow amount of the exhaust gas detected by the exhaust-gas flow amount detecting sensor 45f varies.

In addition, in the present embodiment, when the flow amount of the exhaust gas detected by the exhaust-gas flow amount detecting sensor 45f is in the range smaller than the predetermined second threshold, the reduction amount of the supply amount of the urea determined by the second reduction amount determiner 72 is set to vary more greatly as the flow amount of the exhaust gas detected by the exhaust-gas flow amount detecting sensor 45f varies, when the temperature of the $NO_x$ catalyst 45 detected by the $NO_x$-catalyst-temperature detecting sensor 45t is higher.

The DCU 70 of the present embodiment is configured to reduce and adjust the supply amount of the urea to the SCR catalyst 47, based on the sum of the reduction amount of the supply amount of the urea determined by the first reduction amount determiner 71 and the reduction amount of the supply amount of the urea determined by the second reduction amount determiner 72.

Figure 9A:
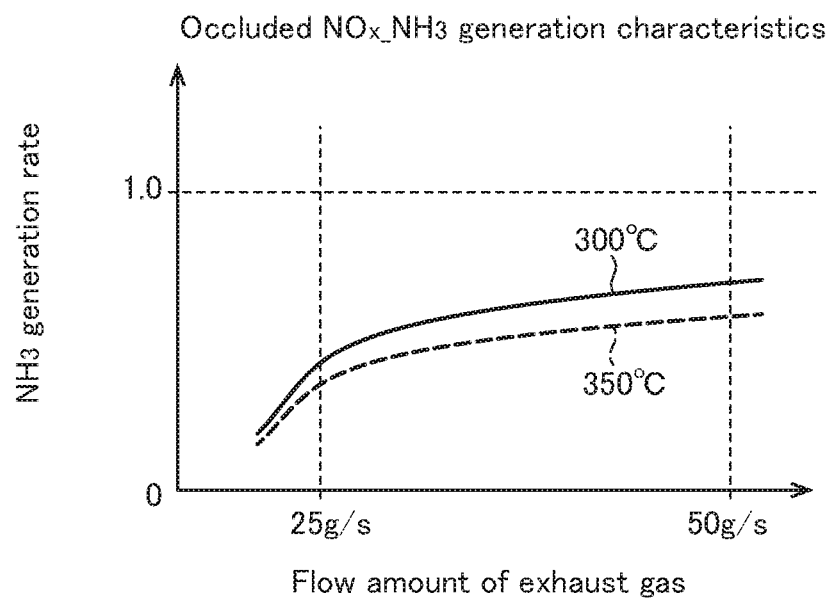
FIG. 9A is data of a generated amount of $NH_3$ generated in a purification process of $NO_x$ that has been occluded in an $NO_x$ catalyst, against variation of a flow amount of an exhaust gas.
Figure 9B:
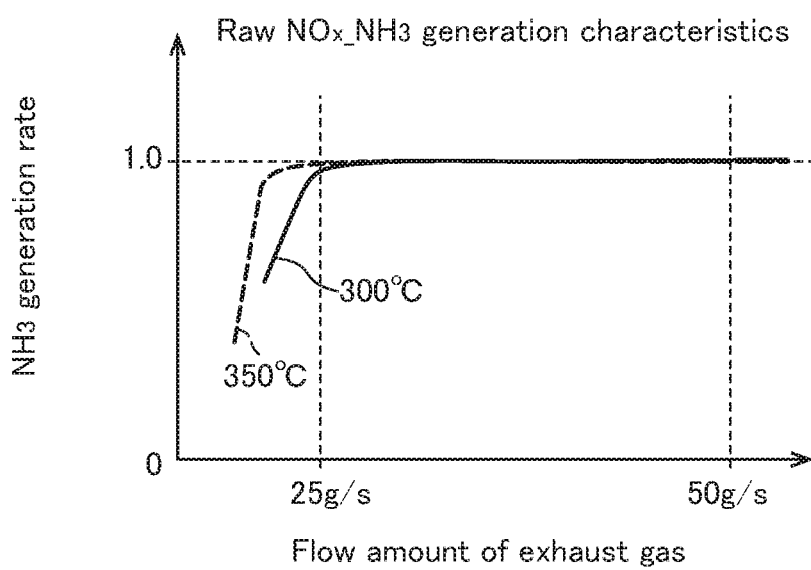
FIG. 9B is data of a generated amount of $NH_3$ generated in a purification process of Raw $NO_x$ discharged from the engine, against the variation of the flow amount of the exhaust gas.

The above way for the DCU 70 to determine the reduction amount of the supply amount of the urea is based on experimental data shown in FIGS. 9A and 9B.

FIG. 9A shows data for an amount of the $NH_3$ (ammonia) generated in the purification process of the $NO_x$ that has been occluded in the $NO_x$ catalyst 45, against variation of the flow amount of the exhaust gas, when $\lambda=0.96$ and the temperature of the $NO_x$ catalyst 45 is 300 to 350° C. There is tendency wherein, when the flow amount of the exhaust gas is larger, the amount of the generated $NH_3$ is smaller. The inventors consider that the reason therefor is as follows. When the flow amount of the exhaust gas is larger, a supply amount of components serving as a reducing agent ("H" of "HC", or "H" of "$H_2O$") is also larger.

In addition, there is also tendency wherein, when the temperature of the $NO_x$ catalyst 45 is higher, the amount of the generated $NH_3$ is smaller. As described in the above <(1) Control Considering Temperature of $NO_x$ catalyst>, the inventors consider that the reason therefor is as follows. In the $NO_x$ catalyst 45, both a reaction generating $NH_3$ (for example, $BaNO_3+CO+H_2\rightarrow NH_3$, $NO+CO+H_2\rightarrow NH_3$) and a reaction consuming (decomposing) the $NH_3$ ($BaNO_3+NH_3\rightarrow N_2$, $NO+NH_3\rightarrow N_2$) occur, but the former reaction is more dominant than the latter one when the temperature of the $NO_x$ catalyst 45 is higher.

In addition, when the flow amount of the exhaust gas is increased from 20 g/s to 50 g/s, there is tendency wherein the amount of the generated $NH_3$ reduces less greatly (the gradient is smaller) as the flow amount of the exhaust gas is increased. In particular, when the flow amount of the exhaust gas is in the range equal to or larger than the predetermined first threshold (for example, 25 g/s), the amount of the generated $NH_3$ is increased less greatly, compared with in the range smaller than the first threshold, as the flow amount of the exhaust gas is increased. The inventors consider that the reason therefor is as follows. When the flow amount of the exhaust gas is in the range equal to or larger than the predetermined first threshold, diffusion of the exhaust gas has an effect on inhibition of the reaction generating the $NH_3$.

In the first reduction amount determiner 71, a correspondence table (or function) is prepared in advance in which: characteristics as shown in FIG. 9A are reflected, and thus (the air-fuel ratio and) the temperature of the $NO_x$ catalyst 45 detected by the $NO_x$-catalyst-temperature detecting sensor 45t and the flow amount of the exhaust gas detected by the exhaust-gas flow amount detecting sensor 45f are input parameters while the reduction amount of the supply amount of the urea is an output parameter. This matches the contents described in the above paragraphs 0148 to 0154.

FIG. 9B shows data for an amount of the $NH_3$ (ammonia) generated in the purification process of the Raw $NO_x$ discharged from the engine, against variation of the flow amount of the exhaust gas, when $\lambda=0.96$ and the temperature of the $NO_x$ catalyst 45 is 300 to 350° C. When the flow amount of the exhaust gas is in the range smaller than the predetermined second threshold (for example, 25 g/s), the amount of the generated $NH_3$ in the purification process of the Raw $NO_x$ varies more greatly against the variation of the flow amount of the exhaust gas, compared with the variation of the amount of the generated $NH_3$ in the purification process of the occluded $NO_x$ against the variation of the flow amount of the exhaust gas (see FIG. 9A). Furthermore, in the same range, there is tendency wherein, gradient of the variation of the amount of the generated $NH_3$ in the purification process of the Raw $NO_x$ against the variation of the flow amount of the exhaust gas is greater, when the temperature of the $NO_x$ catalyst 45 is higher.

To the contrary, when the flow amount of the exhaust gas is in the range equal to or larger than the predetermined second threshold, the amount of the generated $NH_3$ in the purification process of the Raw $NO_x$ varies less greatly (substantially keeps constant) against the variation of the flow amount of the exhaust gas, compared with the variation of the amount of the generated $NH_3$ in the purification process of the occluded $NO_x$ against the variation of the flow amount of the exhaust gas (see FIG. 9A).

In the second reduction amount determiner 72, a correspondence table (or function) is prepared in advance in which: characteristics as shown in FIG. 9B are reflected, and thus (the air-fuel ratio and) the temperature of the $NO_x$ catalyst 45 detected by the $NO_x$-catalyst-temperature detecting sensor 45t and the flow amount of the exhaust gas detected by the exhaust-gas flow amount detecting sensor 45f are input parameters while the reduction amount of the supply amount of the urea is an output parameter. This matches the contents described in the above paragraphs 0148 to 0154.

<(3) Control Considering Amount of Reducing Agent>

The PCM 60 of the present embodiment is configured to reduce and adjust the supply amount of the urea to the SCR catalyst 47 by the urea injector 51, by considering the amount of the reducing agent (HC, CO), in addition to the above <(1) Control Considering Temperature of $NO_x$ catalyst> or the above <(2) Control Mainly Considering Flow Amount of Exhaust Gas>, or as an alternative to any of them. Specifically, an amount of the reducing agent can be obtained (known) from the target air-fuel ratio set by the PCM 60. A reduction amount of the supply amount of the urea determined by the DCU 70 is set larger when the target air-fuel ratio set by the PCM 60 is smaller and thus when the amount of the reducing agent is judged to be larger (in the present embodiment, the PCM 60 serves as a reducing agent amount detector).

In addition, as described above, the PCM 60 in the present embodiment has the first reduction amount determiner 71 configured to determine a reduction amount corresponding to a purification process of $NO_x$ that has been occluded in the $NO_x$ catalyst 45, and the second reduction amount determiner 72 configured to determine a reduction amount corresponding to a purification process of Raw $NO_x$.

The reduction amount of the supply amount of the urea determined by the first reduction amount determiner 71 is set to vary more greatly, compared with the reduction amount of the supply amount of the urea determined by the second reduction amount determiner 72, as the amount of the reducing agent estimated by the PCM 60 (reducing agent amount detector) varies.

In addition, the reduction amount of the supply amount of the urea determined by the first reduction amount determiner 71 is set larger when the flow amount of the exhaust gas detected by the exhaust-gas flow amount detecting sensor 45f is larger.

In addition, when the estimated amount of the reducing agent is in a range equal to or larger than a predetermined threshold (for example, a threshold corresponding to an air-fuel ratio of 0.97), the reduction amount of the supply amount of the urea determined by the second reduction amount determiner 72 is set to vary less greatly, compared with in a range smaller than the threshold, as the estimated amount of the reducing agent varies.

In the present embodiment, when the estimated amount of the reducing agent is in the range equal to or larger than the predetermined threshold (for example, a threshold corresponding to an air-fuel ratio of 0.97), the reduction amount of the supply amount of the urea determined by the second reduction amount determiner 72 is set substantially constant no matter how the amount of the reducing agent estimated by the PCM 60 (reducing agent amount detector) varies.

In addition, in the present embodiment, the reduction amount of the supply amount of the urea determined by the first reduction amount determiner 71 is set to vary at a substantially constant gradient as the amount of the reducing agent estimated by the PCM 60 (reducing agent amount detector) varies.

In addition, in the present embodiment, the reduction amount of the supply amount of the urea determined by the second reduction amount determiner 72 is set to vary more greatly in the range smaller than the above threshold, compared with in the range equal to or larger than the above threshold, as the flow amount of the exhaust gas detected by the exhaust-gas flow amount detecting sensor 45f varies.

The PCM 60 is configured to reduce and adjust the supply amount of the urea to the SCR catalyst 47, based on the sum of the reduction amount of the supply amount of the urea determined by the first reduction amount determiner 71 and the reduction amount of the supply amount of the urea determined by the second reduction amount determiner 72.

Figure 10A:
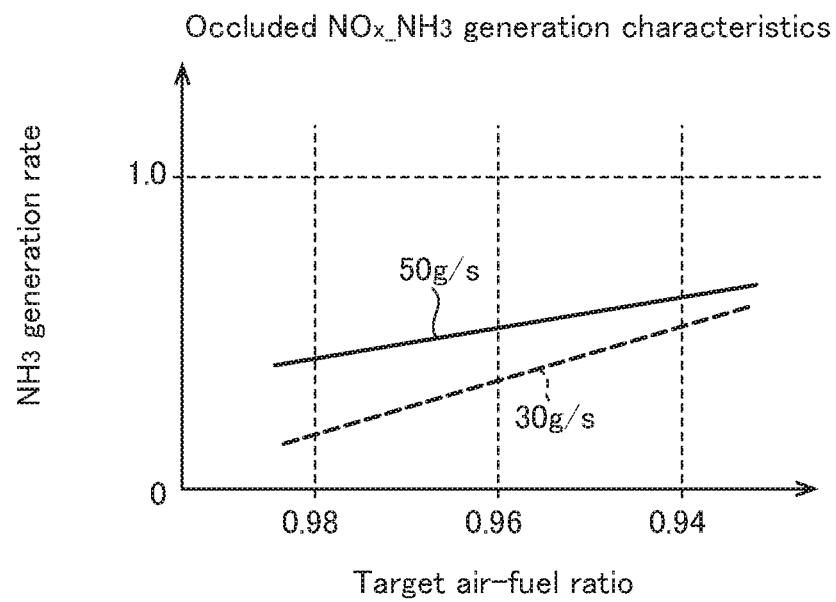
FIG. 10A is data of a generated amount of $NH_3$ generated in a purification process of $NO_x$ that has been occluded in an $NO_x$ catalyst, against variation of a target air-fuel ratio.
Figure 10B:
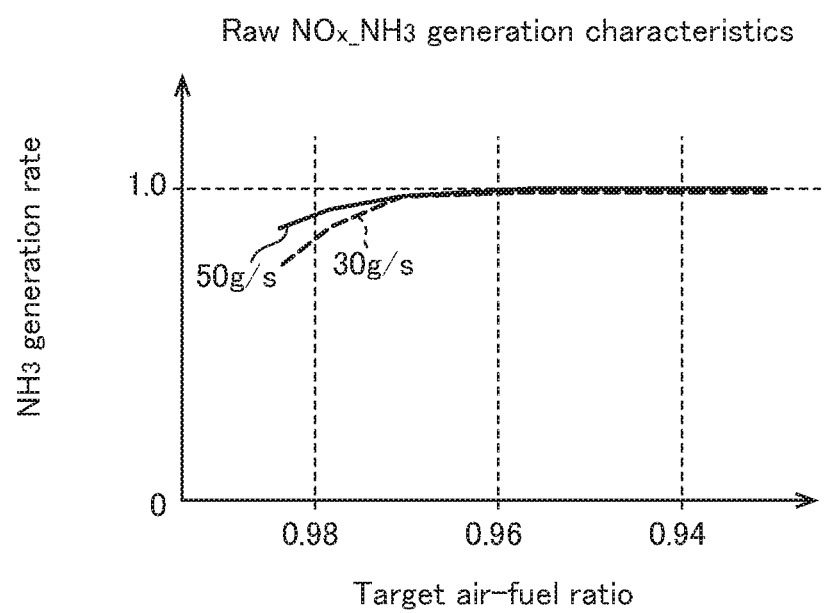
FIG. 10B is data of a generated amount of $NH_3$ generated in a purification process of Raw $NO_x$ discharged from the engine, against the variation of the target air-fuel ratio.

The above way for the DCU 70 to determine the reduction amount of the supply amount of the urea is based on experimental data shown in FIGS. 10A and 10B.

FIG. 10A shows data for an amount of the $NH_3$ (ammonia) generated in the purification process of the $NO_x$ that has been occluded in the $NO_x$ catalyst 45, against variation of the target air-fuel ratio, when the temperature of the $NO_x$ catalyst 45 is 250° C. and the flow amount of the exhaust gas is 30 g/s to 50 g/s. There is tendency wherein the amount of the generated $NH_3$ is increased substantially in inverse proportion to the amount of the reducing agent corresponding to the target air-fuel ratio (substantially in proportion to reduction of the target air-fuel ratio). There is also tendency wherein the amount of the generated $NH_3$ is larger when the flow amount of the exhaust gas is larger. (The reason for the latter tendency is explained in the above <(2) Control Mainly Considering Flow Amount of Exhaust Gas>).

In the first reduction amount determiner 71, a correspondence table (or function) is prepared in advance in which: characteristics as shown in FIG. 10A are reflected, and thus (the temperature of the $NO_x$ catalyst 45 detected by the $NO_x$-catalyst-temperature detecting sensor 45$t$ and) the target air-fuel ratio and the flow amount of the exhaust gas detected by the exhaust-gas flow amount detecting sensor 45$f$ are input parameters while the reduction amount of the supply amount of the urea is an output parameter. This matches the contents described in the above paragraphs 0166 to 0172.

FIG. 10B shows data for an amount of the $NH_3$ (ammonia) generated in the purification process of the Raw $NO_x$ discharged from the engine, against the variation of the target air-fuel ratio, when the temperature of the $NO_x$ catalyst 45 is 250° C. and the flow amount of the exhaust gas is 30 g/s to 50 g/s. The amount of the generated $NH_3$ in the purification process of the Raw $NO_x$ varies less greatly against the variation of the amount of the reducing agent (the variation of the target air-fuel ratio), compared with the variation of the amount of the generated $NH_3$ in the purification process of the occluded $NO_x$ against the variation of the amount of the reducing agent (see FIG. 10A).

In addition, when the estimated amount of the reducing agent is in the range equal to or larger than the predetermined threshold (for example, a threshold corresponding to an air-fuel ratio of 0.97), the amount of the generated $NH_3$ varies less greatly (substantially keeps constant), compared with in the range smaller than the threshold, as the estimated amount of the reducing agent varies.

In addition, when the estimated amount of the reducing agent is in the range smaller than the threshold, the amount of the generated $NH_3$ varies more greatly, compared with in the range equal to or larger than the threshold, as the flow amount of the exhaust gas detected by the exhaust-gas flow amount detecting sensor 45$f$ varies.

In the second reduction amount determiner 72, a correspondence table (or function) is prepared in advance in which: characteristics as shown in FIG. 10B are reflected, and thus (the temperature of the $NO_x$ catalyst 45 detected by the $NO_x$-catalyst-temperature detecting sensor 45$t$ and) the target air-fuel ratio and the flow amount of the exhaust gas detected by the exhaust-gas flow amount detecting sensor 45$f$ are input parameters while the reduction amount of the supply amount of the urea is an output parameter. This matches the contents described in the above paragraphs 0166 to 0172.

<(4) Control Considering Thermal Deterioration of $NO_x$ Catalyst>

The DCU 70 of the present embodiment is configured to reduce and adjust the supply amount of the urea to the SCR catalyst 47 by the urea injector 51, by considering thermal deterioration of the $NO_x$ catalyst 45, in addition to (in combination with) the above <(1) Control Considering Temperature of $NO_x$ catalyst> or the above <(2) Control Mainly Considering Flow Amount of Exhaust Gas> or the above <(3) Control Considering Amount of Reducing Agent>, or as an alternative to any of them, or in further addition to (in further combination to) the combined control of the above <(1) Control Considering Temperature of $NO_x$ catalyst> or the above <(2) Control Mainly Considering Flow Amount of Exhaust Gas> with the above <(3) Control Considering Amount of Reducing Agent>. Specifically, a reduction amount of the supply amount of the urea determined by the DCU 70 is set larger when the degree of the thermal deterioration of the $NO_x$ catalyst 45 is estimated to be larger by the PCM 60 (in the present embodiment, the PCM 60 serves as an $NO_x$-catalyst thermal deterioration detector).

For example, the degree of the thermal deterioration of the $NO_x$ catalyst 45 may be estimated based on a running distance, which is one of various information of the vehicle. In this case, information of the running distance and/or information of the degree of the thermal deterioration ( ), which may be derived as a function of the running distance, may be stored in the inside memory of the PCM 60.

Alternatively, the degree of the thermal deterioration of the $NO_x$ catalyst 45 may be estimated based on an elapsed time from manufacture of the $NO_x$ catalyst 45. For example, information regarding a manufacture point in time of the $NO_x$ catalyst 45 may be stored in the inside memory of the PCM 60 or the DCU 70 as one of various information of the vehicle, and the PCM 60 or the DCU 70 may calculate an elapsed time till the current point in time at a suitable timing, in order to obtain information of the degree of the thermal deterioration of the $NO_x$ catalyst 45.

As described above, the PCM 60 of the present embodiment has the first reduction amount determiner 71 configured to determine a reduction amount corresponding to a purification process of $NO_x$ that has been occluded in the $NO_x$ catalyst 45, and the second reduction amount determiner 72 configured to determine a reduction amount corresponding to a purification process of Raw $NO_x$.

The reduction amount of the supply amount of the urea determined by the first reduction amount determiner 71 is set to vary more greatly, compared with the reduction amount of the supply amount of the urea determined by the second reduction amount determiner 72, as the degree of the thermal deterioration of the $NO_x$ catalyst 45 estimated by the PCM 60 ($NO_x$-catalyst thermal deterioration detector) varies.

Furthermore, the reduction amount of the supply amount of the urea determined by the second reduction amount determiner 72 is set substantially constant no matter how the degree of the thermal deterioration of the $NO_x$ catalyst 45 estimated by the PCM 60 ($NO_x$-catalyst thermal deterioration detector) varies.

In addition, in the present embodiment, the reduction amount of the supply amount of the urea determined by the first reduction amount determiner 71 is set smaller when the temperature of the $NO_x$ catalyst 45 detected by the $NO_x$-catalyst-temperature detecting sensor 45$t$ is higher. (The reduction amount of the supply amount of the urea determined by the second reduction amount determiner 72 is set to keep substantially constant even when the temperature of the $NO_x$ catalyst 45 detected by the $NO_x$-catalyst-temperature detecting sensor 45$t$ varies.)

The DCU 70 is configured to reduce and adjust the supply amount of the urea to the SCR catalyst 47, based on the sum of the reduction amount of the supply amount of the urea determined by the first reduction amount determiner 71 and the reduction amount of the supply amount of the urea determined by the second reduction amount determiner 72.

Figure 11A:
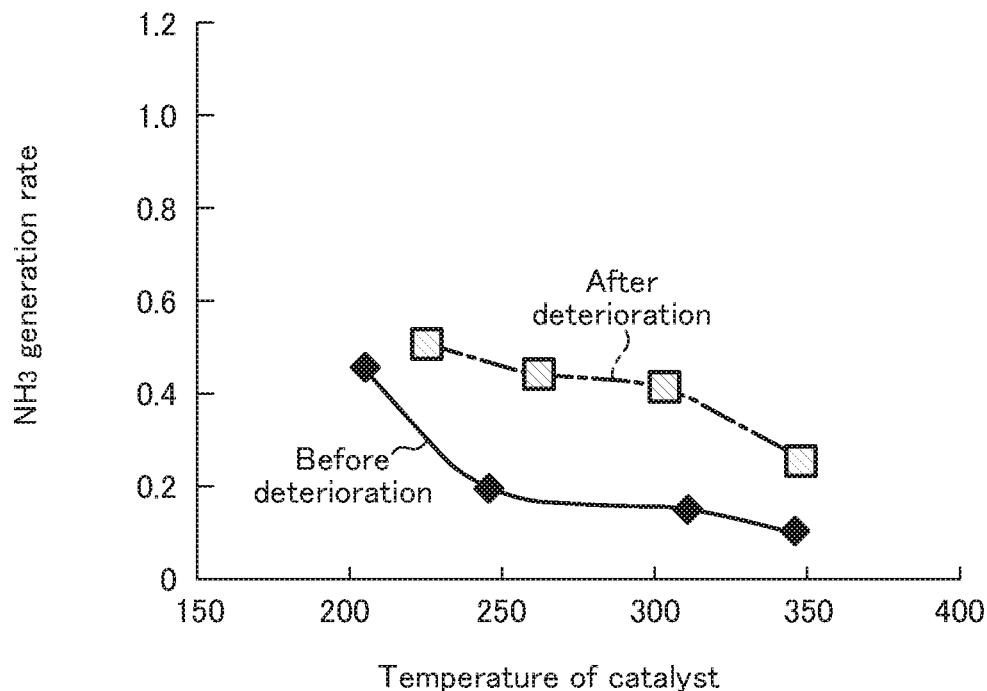
FIG. 11A is data of a generated amount of $NH_3$ generated in a purification process of $NO_x$ that has been occluded in an $NO_x$ catalyst, against thermal deterioration of $NO_x$ catalyst and a variation of a temperature of the $NO_x$ catalyst.
Figure 11B:
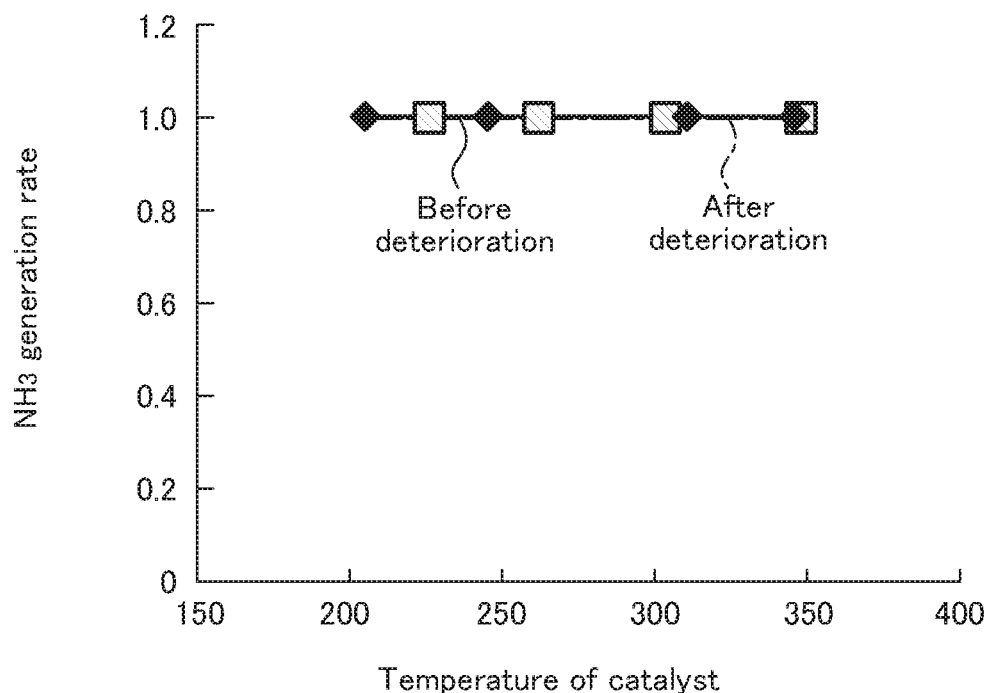
FIG. 11B is data of a generated amount of $NH_3$ generated in a purification process of Raw $NO_x$ discharged from the engine, against the thermal deterioration of the $NO_x$ catalyst and the variation of the temperature of the $NO_x$ catalyst.

The above way for the DCU 70 to determine the reduction amount of the supply amount of the urea is based on experimental data shown in FIGS. 11A and 11B.

FIG. 11A corresponds to FIG. 8A, and shows data for an amount of the $NH_3$ (ammonia) generated in the purification process of the $NO_x$ that has been occluded in the $NO_x$ catalyst 45, when λ=0.94 and the flow amount of the exhaust gas is 30 g/s. There is tendency wherein, when the temperature of the $NO_x$ catalyst 45 is higher, the amount of the generated $NH_3$ is smaller. There is also tendency wherein, when the degree of the thermal deterioration of the $NO_x$ catalyst 45 is higher, the amount of the generated $NH_3$ is larger. The reason for the former tendency is explained in the above <(1) Control Considering Temperature of $NO_x$ catalyst>). The inventors consider that the reason for the latter tendency is as follows. When the degree of the thermal deterioration of the $NO_x$ catalyst 45 is higher, a reaction-inhibiting effect appears more dominant against the reaction consuming (decomposing) the $NH_3$ (see paragraph 0142) in the $NO_x$ catalyst 45, so that the amount of the generated $NH_3$ is increased.

In the first reduction amount determiner 71, a correspondence table (or function) is prepared in advance in which: characteristics as shown in FIG. 11A are reflected, and thus (the air-fuel ratio and the flow amount of the exhaust gas detected by the exhaust-gas flow amount detecting sensor 45*f* and) the temperature of the $NO_x$ catalyst 45 detected by the $NO_x$-catalyst-temperature detecting sensor 45*t* and the information of the degree of the thermal deterioration of the $NO_x$ catalyst 45 are input parameters while the reduction amount of the supply amount of the urea is an output parameter. This matches the contents described in the above paragraphs 0180 to 0187.

FIG. 11B corresponds to FIG. 8B, and shows data for an amount of the $NH_3$ (ammonia) generated in the purification process of the Raw $NO_x$ discharged from the engine, when $\lambda=0.94$ and the flow amount of the exhaust gas is 30 g/s. There is tendency wherein, even when the temperature of the $NO_x$ catalyst 45 is higher, the amount of the generated $NH_3$ hardly changes. There is also tendency wherein, even when the degree of the thermal deterioration of the $NO_x$ catalyst 45 is higher, the amount of the generated $NH_3$ hardly changes. The reason for the former tendency is explained in the above <(1) Control Considering Temperature of $NO_x$ catalyst>). The inventors consider that the reason for the latter tendency is as follows. In the purification process of the Raw $NO_x$ in the $NO_x$ catalyst 45, the reaction consuming the $NH_3$ occurs only a little. Thus, even when the reaction-inhibiting effect against the reaction consuming the $NH_3$ is increased, the reaction-inhibiting effect does not appear dominantly.

In the second reduction amount determiner 72, a correspondence table (or function) is prepared in advance in which: characteristics as shown in FIG. 11B are reflected, and thus (the air-fuel ratio and the flow amount of the exhaust gas detected by the exhaust-gas flow amount detecting sensor 45*f* and) the temperature of the $NO_x$ catalyst 45 detected by the $NO_x$-catalyst-temperature detecting sensor 45*t* and the information of the degree of the thermal deterioration of the $NO_x$ catalyst 45 are input parameters while the reduction amount of the supply amount of the urea is an output parameter which is substantially constant. This matches the contents described in the above paragraphs 0180 to 0187.

<(5) Control Considering Amount of Oxygen Occluded in $NO_x$ Catalyst>

Figure 12:
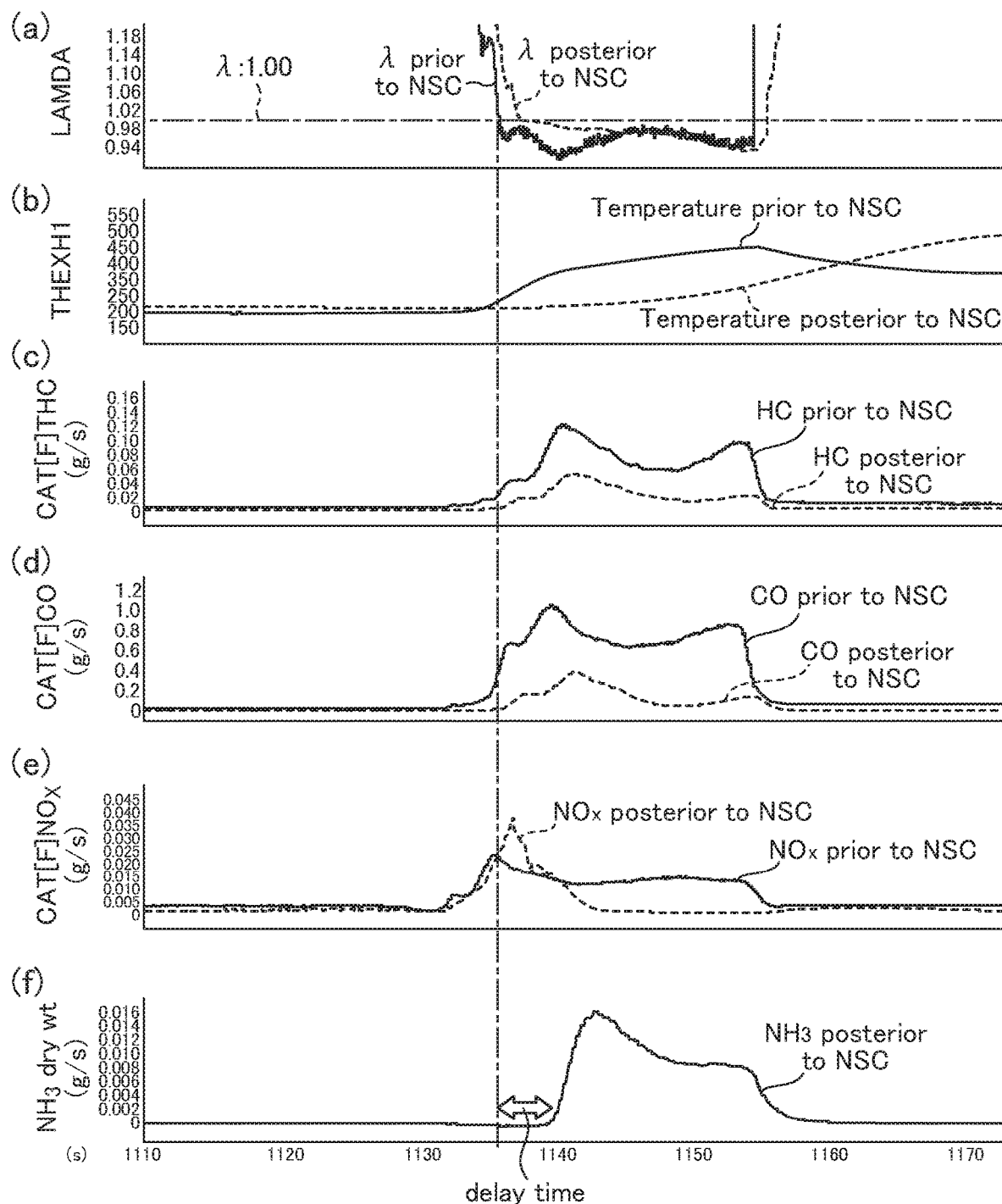
FIG. 12 is an example of time chart of $DeNO_x$ control according to the present embodiment.

Herein, FIG. 12 shows an example of time chart of $DeNO_x$ control according to the present embodiment (performed for 20 seconds, with the temperature of the $NO_x$ catalyst 45 being 220° C. and the flow amount of the exhaust gas being 44 g/s). There are shown measurement values on a side upstream of (prior to) the $NO_x$ catalyst 45 and on a side downstream of (posterior to) the $NO_x$ catalyst 45 for each of: (a) the air-fuel ratio of the exhaust gas (target air-fuel ratio $\lambda=0.96$), (b) the temperature of the exhaust gas, (c) the amount of the HC in the exhaust gas (g/s), (d) the amount of the CO in the exhaust gas (g/s) and (e) the amount of the $NO_x$ in the exhaust gas (g/s), in order from the top.

The time chart shown in FIG. 12 is explained. When a starting command for the $DeNO_x$ control is given at a point in time T=1130, the parameter $\lambda$ starts to be gradually decreased toward the target value 0.98 or smaller. When the parameter $\lambda$ is decreased, the amounts of the HC, CO and $NO_x$ (Raw HC, Raw CO and Raw $NO_x$) are increased. Until the parameter $\lambda$ is decreased sufficiently, the $NO_x$ reduction reaction is not likely to occur in the NSC. Thus, the Raw $NO_x$ as well as the $NO_x$ removed away from the NSC are not likely to be reduced, so that the amount of the $NO_x$ on the side downstream of the NSC is increased.

When the parameter $\lambda$ is decreased sufficiently (T=1137), the $NO_x$ becomes easy to be reduced. Thus, the amount of the $NO_x$ on the side downstream of the NSC is decreased. Finally, almost all of the $NO_x$ is reduced (T=1142). Thereafter, until a finishing command for the $DeNO_x$ control is given (T=1155), the parameter $\lambda$ is controlled 0.98 or smaller, the $NO_x$ that has been occluded in the NSC is removed away and reduced, the $DeNO_x$ control for reducing and purifying the occluded $NO_x$ is continued (the Raw $NO_x$ is also purified).

On the other hand, as described above, the $DeNO_x$ control generates $NH_3$. The graph (f) shows the estimated value of the amount of the generated $NH_3$. When the parameter $\lambda$ is decreased by the start of the $DeNO_x$ control, the amounts of the Raw HC and Raw CO are increased, and the oxygen that has occluded in the NSC (occluded oxygen) reacts with the Raw HC and the Raw CO, so that the Raw HC and Raw CO in the NSC which might generate $NH_3$ are oxidized and disappear and thus no $NH_3$ is generated. The occluded oxygen in the $NO_x$ catalyst 45 is consumed by reacting with the $NH_3$ generated by the reducing reaction of the $NO_x$, and finally becomes zero.

When the amount of the occluded oxygen becomes zero, the HC and/or the CO start to appear in the NSC, which starts to generate the $NH_3$. Therefore, although the amount of the generated $NH_3$ is considered zero before T=1140, the amount of the generated $NH_3$ starts to be estimated according to a control logic described below and shown in FIG. 12 after T=1140. That is, there is provided a delay from the start of the $DeNO_x$ control until T=1140.

Due to this delay, in the control wherein the supply amount of the urea to the SCR catalyst 47 by the urea injector 51 is reduced and adjusted, the assumption of the amount of the generated $NH_3$ in the $NO_x$ catalyst 45 being zero is considered during a predetermined time after the start of the $DeNO_x$ control.

Herein, according to findings by the inventors, the reaction generating the $NH_3$ in the $NO_x$ catalyst 45 is promoted more when the flow amount of the exhaust gas is larger and/or when the air-fuel ratio is richer. Thus, oxygen that has been released from the $NO_x$ catalyst 45 is consumed within a shorter time.

Thus, it is preferable that the above delay time is set shorter when the flow amount of the exhaust gas detected by the exhaust-gas flow amount detecting sensor 45*f* is larger and/or when the air-fuel ratio is richer.

In the above example, effects brought by the occluded oxygen are reflected by the delay. However, as an alternative method, an $NO_x$-catalyst occluded-oxygen-amount detector may be provided (in which, for example, an amount of oxygen supplied to the NSC based on information such as the air flow sensor or the fuel injection amount is estimated, an amount of occluded oxygen is estimated based on the amount of the supplied oxygen, an amount of occluded oxygen consumed by the reaction with the HC and the CO is also estimated, and the current amount of occluded oxygen is estimated). The amount of the generated $NH_3$ may be judged to be zero until the amount of the occluded oxygen detected or estimated by the $NO_x$-catalyst occluded-oxygen-amount detector becomes zero.

In the above explanation, it should be understood that the state wherein the supply amount of the urea has not yet started to be reduced and adjusted means basically a state wherein the reduction amount of the supply amount of the urea is still zero, but also includes a state wherein the reduction amount of the supply amount of the urea is extremely a little.

If the control manner is defined further broader, this may be expressed as a manner wherein the reduction amount of the supply amount of the urea is set smaller when the amount of the occluded oxygen detected or estimated by the $NO_x$-catalyst occluded-oxygen-amount detector is larger.

<(6) Injection Control of Urea Injector During $DeNO_x$ Control>

The injection control of the urea injector 51 during the $DeNO_x$ control as explained above is also applicable to an injection control or the urea injector 51 during a DeSOx control. The DeSOx control is performed when an S poisoned amount of the $NO_x$ catalyst 45 becomes equal to or larger than a predetermined threshold, for example when PM regeneration of the $NO_x$ catalyst 45 is performed or when the running distance of the vehicle reaches a predetermined running distance.

However, during the DeSOx control, differently from the $DeNO_x$ control, the temperature of the $NO_x$ catalyst 45 is maintained in a high-temperature state (600° C. to 650° C.), and an intermittent lean operation is performed in order to maintain the high-temperature state (for example, 30 sec rich→30 sec lean→30 sec rich→30 sec lean→ - - - ).

Thus, for the injection control of the urea injector 51 during the DeSOx control, it is necessary to modify the contents of the injection control of the urea injector 51 during the $DeNO_x$ control.

Specifically, during the DeSOx control, the temperature of the $NO_x$ catalyst 45 is maintained in the high-temperature state (600° C. to 650° C.). Thus, a phenomenon that the occluded $NO_x$ is removed away without being reduced occurs (the $NO_x$ is supplied to the SCR catalyst 47 as it is). In addition, during the DeSOx control, since the intermittent lean operation is performed, the substantially air-fuel ratio is shifted to the lean side. These two phenomena reduce the amount of the generated $NH_3$ in the $NO_x$ catalyst 45.

Thus, in the case wherein the characteristics as shown in FIGS. 8 to 12 are reflected and thus the temperature of the $NO_x$ catalyst 45, the flow amount of the exhaust gas, the air-fuel ratio of the exhaust gas, the degree of the thermal deterioration of the $NO_x$ catalyst 45, or the like are input parameters while the supply amount of the $NH_3$ from the $NO_x$ catalyst 45 to the SCR catalyst 47, i.e., the reduction amount of the supply amount of the urea is an output parameter, if the calculation method for the reduction amount is applied to the DeSOx control, a modification to further reduce (lower) the reduction amount is necessary (see FIG. 7).

In this modification, it is preferable to consider the amount of the $NO_x$ occluded in the $NO_x$ catalyst 45 in order to correctly reflect the effects brought by the occluded $NO_x$ in the $NO_x$ catalyst 45 being removed away. When the amount of the $NO_x$ occluded in the $NO_x$ catalyst 45 is smaller, the effects brought by the occluded $NO_x$ in the $NO_x$ catalyst 45 being removed away are also smaller.

Furthermore, in order to judge the amount of the $NO_x$ occluded in the $NO_x$ catalyst 45, it may be also effective to consider the S poisoned amount of the $NO_x$ catalyst 45. It is considered that, when the $NO_x$ catalyst 45 is S poisoned, the amount of the $NO_x$ occluded therein is smaller by an amount corresponding thereto. The S poisoned amount of the $NO_x$ catalyst 45 may be estimated based on an S generation map dependent on the engine driving state (the load of the engine, the rotation speed of the engine), which may be measured by experiments in advance.

DESCRIPTION OF REFERENCE SIGNS

20 Fuel injection valve
41 Exhaust passage
45 $NO_x$ catalyst
45*a* Oxidation catalyst
45*t* $NO_x$-catalyst-temperature detecting sensor
45*f* Exhaust-gas flow amount detecting sensor
45*n* $NO_x$-occlusion-amount detecting sensor
45*o* Oxygen sensor (Occluded-oxygen-amount detecting sensor)
47 SCR catalyst
47*t* SCR-catalyst-temperature detecting sensor
47*n* $NH_3$-absorption-amount detecting sensor
51 Urea injector
53 Urea supply passage
54 Urea delivery pump
55 Urea tank
60 PCM
70 DCU ($NH_3$ supply amount controller)
71 First reduction amount determiner
72 Second reduction amount determiner
200 Engine system
E Engine
EX Exhaust gas system
FS Fuel supply system
IN Intake system
λ1 Stoichiometric air-fuel ratio
λ2 Limit air-fuel ratio

What is claimed is:

1. An exhaust gas purification controller for an engine, comprising
    an $NO_x$ catalyst provided on an exhaust gas passage of the engine, and configured to occlude $NO_x$ in a flowing-in exhaust gas in a state wherein an air-fuel ratio of the flowing-in exhaust gas is leaner than a stoichiometric air-fuel ratio and to reduce the occluded $NO_x$ to $N_2$ in a state wherein the air-fuel ratio of the flowing-in exhaust gas is richer than the stoichiometric air-fuel ratio,
    an $NO_x$ catalyst regenerator control circuit configured to control a fuel injection valve in the engine in order to make the air-fuel ratio of the exhaust gas flowing into the $NO_x$ catalyst richer,
    an SCR catalyst provided on the exhaust gas passage downstream the $NO_x$ catalyst, and configured to purify $NO_x$ by a reaction with $NH_3$,
    an $NH_3$ supplier injector nozzle configured to supply $NH_3$ or a raw material for $NH_3$ to the SCR catalyst and cause the SCR catalyst to absorb the $NH_3$ or the raw material for $NH_3$,
    an $NH_3$ supply amount control circuit configured to control a supply amount of the $NH_3$ or the raw material for $NH_3$ to the SCR catalyst by the $NH_3$ supplier injector nozzle, and an $NO_x$ catalyst temperature detector configured to detect or estimate a temperature of the $NO_x$ catalyst, and an exhaust-gas flow amount detector configured to detect or estimate a flow amount of the exhaust gas, wherein the $NH_3$ supply amount control circuit is configured to reduce the supply amount of the $NH_3$ or the raw material for $NH_3$ to the SCR catalyst by the $NH_3$ supplier injector nozzle when the $NO_x$ catalyst regenerator control circuit has performed an $NO_x$ catalyst regeneration, compared with when the $NO_x$ catalyst regenerator control circuit has not performed the $NO_x$ catalyst regeneration, the supply amount of the $NH_3$ or the raw material for $NH_3$ controlled by the $NH_3$ supply amount control circuit when the $NO_x$ catalyst regenerator control circuit has performed the $NO_x$ catalyst regeneration is set to increase when the temperature of the $NO_x$ catalyst detected or estimated by the $NO_x$ catalyst temperature detector increases, and the supply amount of the $NH_3$ or the raw material for $NH_3$ controlled by the $NH_3$ supply amount control circuit when the $NO_x$ catalyst regenerator control circuit has performed the $NO_x$ catalyst regeneration is set to decrease when the temperature of the $NO_x$ catalyst detected or estimated by the $NO_x$ catalyst temperature detector decreases, a reduction amount of the supply amount of the $NH_3$ or the raw material for $NH_3$ controlled by the $NH_3$ supply amount control circuit is set to decrease when the temperature of the $NO_x$ catalyst detected or estimated by the $NO_x$ catalyst temperature detector increases, and the reduction amount of the supply amount of the $NH_3$ or the raw material for $NH_3$ controlled by the $NH_3$ supply amount control circuit is set to vary less greatly as the temperature of the $NO_x$ catalyst detected or estimated by the $NO_x$ catalyst temperature detector varies, when the flow amount of the exhaust gas detected or estimated by the exhaust-gas flow amount detector increases.

2. The exhaust gas purification controller for the engine according to claim 1, further comprising an SCR catalyst temperature detector configured to detect or estimate a temperature of the SCR catalyst, wherein when the flow amount of the exhaust gas detected or estimated by the exhaust-gas flow amount detector is smaller than a predetermined threshold and when the temperature of the SCR catalyst detected or estimated by the SCR catalyst temperature detector is smaller than a predetermined threshold, purification of $NO_x$ is performed mainly only by the $NO_x$ catalyst, when the flow amount of the exhaust gas detected or estimated by the exhaust-gas flow amount detector is smaller than a predetermined threshold and when the temperature of the SCR catalyst detected or estimated by the SCR catalyst temperature detector is equal to or larger than a predetermined threshold, purification of $NO_x$ is performed mainly only by the SCR catalyst, and when the flow amount of the exhaust gas detected or estimated by the exhaust-gas flow amount detector is equal to or larger than a predetermined threshold, both the purification of $NO_x$ by the $NO_x$ catalyst and the purification of $NO_x$ by the SCR catalyst are performed.

3. The exhaust gas purification controller for the engine according to claim 2, wherein when the purification of $NO_x$ is performed mainly only by the $NO_x$ catalyst, the $NH_3$ supply amount control circuit is configured to limit the supply amount of the $NH_3$ or the raw material for $NH_3$ to the SCR catalyst by the $NH_3$ supplier injector nozzle, and when the purification of $NO_x$ is performed mainly only by the SCR catalyst, an operation of the $NO_x$ catalyst regenerator control circuit is limited.

4. The exhaust gas purification controller for the engine according to claim 1, wherein the $NH_3$ supply amount control circuit has a first reduction amount determiner configured to determine a reduction amount corresponding to a purification process of $NO_x$ that has been occluded in the $NO_x$ catalyst, and a second reduction amount determiner configured to determine a reduction amount corresponding to a purification process of Raw $NO_x$, and the reduction amount of the supply amount of the $NH_3$ or the raw material for $NH_3$ determined by the first reduction amount determiner is set to vary more greatly, compared with the reduction amount of the supply amount of the $NH_3$ or the raw material for $NH_3$ determined by the second reduction amount determiner, as the temperature of the $NO_x$ catalyst detected or estimated by the $NO_x$ catalyst temperature detector varies.

5. The exhaust gas purification controller for the engine according to claim 4, further comprising an exhaust-gas flow amount detector configured to detect or estimate a flow amount of the exhaust gas, wherein both the reduction amount of the supply amount of the $NH_3$ or the raw material for $NH_3$ determined by the first reduction amount determiner and the reduction amount of the supply amount of the $NH_3$ or the raw material for $NH_3$ determined by the second reduction amount determiner are set to vary less greatly as the temperature of the $NO_x$ catalyst detected or estimated by the $NO_x$ catalyst temperature detector varies, when the flow amount of the exhaust gas detected or estimated by the exhaust-gas flow amount detector is larger, and the reduction amount of the supply amount of the $NH_3$ or the raw material for $NH_3$ determined by the first reduction amount determiner is set to vary more greatly, compared with the reduction amount of the supply amount of the $NH_3$ or the raw material for $NH_3$ determined by the second reduction amount determiner, as the flow amount of the exhaust gas detected or estimated by the exhaust-gas flow amount detector varies.

6. The exhaust gas purification controller for the engine according to claim 5, wherein the reduction amount of the supply amount of the $NH_3$ or the raw material for $NH_3$ determined by the second reduction amount determiner is set substantially constant no matter how the temperature of the $NO_x$ catalyst detected or estimated by the $NO_x$ catalyst temperature detector varies.

7. The exhaust gas purification controller for the engine according to claim 4, wherein the $NH_3$ supply amount control circuit is configured to reduce and adjust the supply amount of the $NH_3$ or the raw material for $NH_3$ to the SCR catalyst by the $NH_3$ supplier injector nozzle, based on the reduction amount of the supply amount of the $NH_3$ or the raw material for $NH_3$ determined by the first reduction amount determiner and the reduction amount of the supply amount of the $NH_3$ or the raw material for $NH_3$ determined by the second reduction amount determiner.

\* \* \* \* \*